US012619690B2

(12) United States Patent
Kawamoto et al.

(10) Patent No.:    US 12,619,690 B2
(45) Date of Patent:         May 5, 2026

(54) TYPE-1 AUTHENTICATION BASED ON AI-GENERATED QUERIES

(71) Applicant: SONY GROUP CORPORATION, Tokyo (JP)

(72) Inventors: Yoji Kawamoto, Bengaluru (IN); Madhvesh Sulibhavi, Bengaluru (IN); Jaison Joseph, Bengaluru (IN)

(73) Assignee: SONY GROUP CORPORATION, Tokyo (JP)

( * ) Notice:    Subject to any disclaimer, the term of this patent is extended or adjusted under 35 U.S.C. 154(b) by 353 days.

(21) Appl. No.: 18/194,489

(22) Filed:    Mar. 31, 2023

(65) Prior Publication Data

US 2024/0330419 A1    Oct. 3, 2024

(51) Int. Cl.
| | |
|---|---|
| *G06F 21/31* | (2013.01) |
| *G06F 21/46* | (2013.01) |
| *G06F 40/30* | (2020.01) |
| *G06N 20/00* | (2019.01) |

(52) U.S. Cl.
CPC .............. *G06F 21/31* (2013.01); *G06F 40/30* (2020.01); *G06F 2221/2103* (2013.01)

(58) Field of Classification Search
CPC .. G06F 21/31; G06F 40/30; G06F 2221/2103; G06F 21/46; G06N 20/00
See application file for complete search history.

(56) References Cited

U.S. PATENT DOCUMENTS

| | | | |
|---|---|---|---|
| 8,161,534 B2 | 4/2012 | Golle et al. | |
| 9,043,887 B2 | 5/2015 | Mclachlan et al. | |
| 9,672,335 B2 | 6/2017 | Shuart et al. | |
| 10,476,873 B2 | 11/2019 | Turgeman et al. | |
| 10,592,647 B2 | 3/2020 | Manganelli et al. | |
| 10,915,613 B2 | 2/2021 | Himabindu et al. | |
| 11,347,803 B2 * | 5/2022 | Prabhugaonkar | G06N 3/049 |
| 11,366,972 B2 * | 6/2022 | Kehler | G06F 16/355 |
| 11,741,139 B2 * | 8/2023 | Zhuo | G06F 16/3329 707/722 |
| 12,250,228 B2 * | 3/2025 | Todasco | H04L 63/123 |
| 2019/0095596 A1 * | 3/2019 | Manganelli | G06F 21/32 |
| 2019/0377853 A1 * | 12/2019 | Obaidi | G06F 21/32 |
| 2023/0031901 A1 * | 2/2023 | Sonntag | G06F 16/335 |
| 2023/0262054 A1 * | 8/2023 | Marasco | H04L 63/0861 726/4 |
| 2024/0070242 A1 * | 2/2024 | Poonawala | G06F 21/31 |
| 2024/0311575 A1 * | 9/2024 | Baeuml | G06F 40/56 |

* cited by examiner

*Primary Examiner* — Andrew Suh

(74) *Attorney, Agent, or Firm* — CHIP LAW GROUP

(57)    ABSTRACT

A method and electronic device for type-1 authentication based on AI-generated queries is provided. The method includes receiving, via a user device, a request to access a user account and extracting, based on the request, a NL query of a set of NL queries that is generated based on information associated with a personal life of the user. The method further includes controlling the user device to render the NL query and receiving a response to the NL query from the user device. The method further includes determining a weighted score for the response based on application of a ML model on the response. The weighted score indicates a level of difficulty of the NL query and an accuracy of the response with respect to a NL response for the NL query. The method further includes authenticating the request if the weighted score is above a threshold score.

20 Claims, 7 Drawing Sheets

Figure 3:
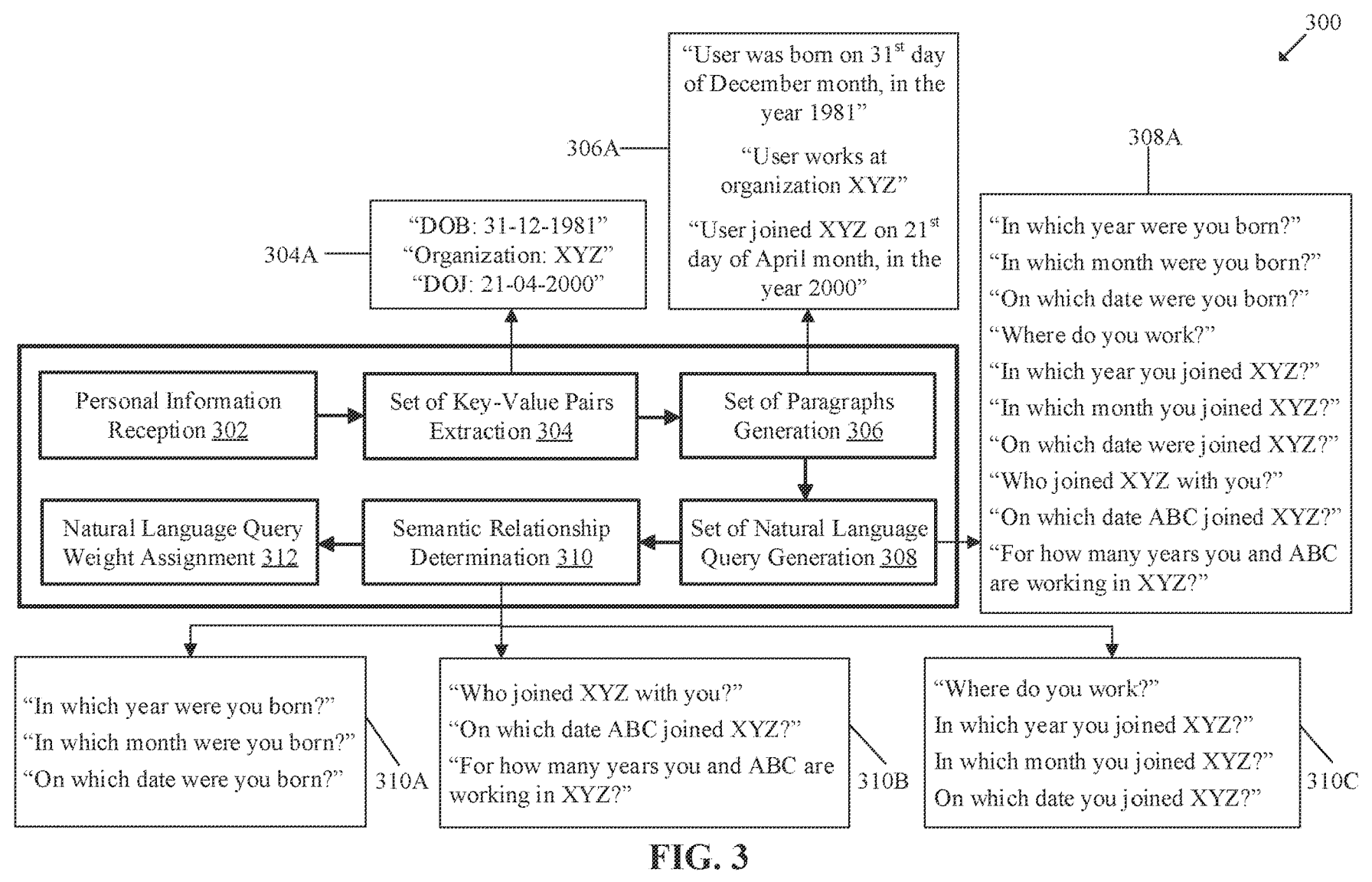

300

308A

"In which year were you born?"
"In which month were you born?"
"On which date were you born?"
"Where do you work?"
"In which year you joined XYZ?"
"In which month you joined XYZ?"
"On which date were joined XYZ?"
"Who joined XYZ with you?"
"On which date ABC joined XYZ?"
"For how many years you and ABC are working in XYZ?"

"Where do you work?"
"In which year you joined XYZ?"
"In which month you joined XYZ?"
"On which date you joined XYZ?"

310C

"User was born on 31st day of December month, in the year 1981"
"User works at organization XYZ"
"User joined XYZ on 21st day of April month, in the year 2000"

306A

| Set of Paragraphs Generation 306 |
| Set of Natural Language Query Generation 308 |

"DOB: 31-12-1981"
"Organization: XYZ"
"DOJ: 21-04-2000"

304A

| Set of Key-Value Pairs Extraction 304 |
| Semantic Relationship Determination 310 |

"Who joined XYZ with you?"
"On which date ABC joined XYZ?"
"For how many years you and ABC are working in XYZ?"

310B

| Personal Information Reception 302 |
| Natural Language Query Weight Assignment 312 |

"In which year were you born?"
"In which month were you born?"
"On which date were you born?"

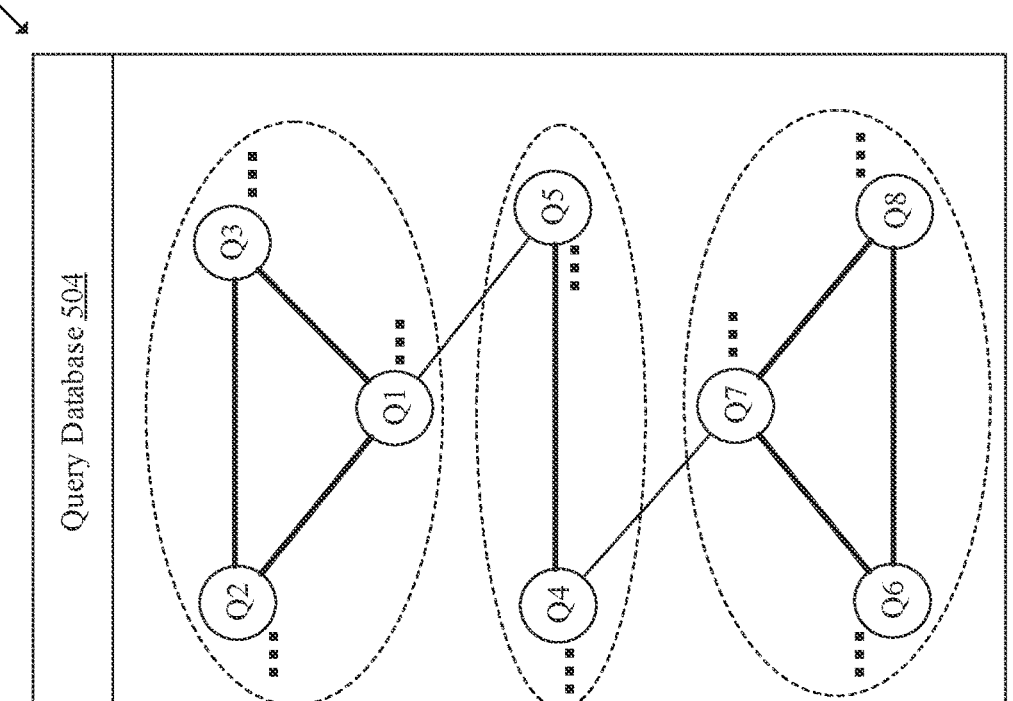

Query Database 504

Set of Natural Language Queries 502

Q1: What was the year when you were born?

Q2: Which is the month of your Birth?

Q3: What is the Date on which you were born?

Q4: In which year you got Married?

Q5: What is your Age in years at the Time of your Marriage ?

Q6: What is the Name of Your Wife?

Q7: In which year you got married to Lisa?

Q8: What is the starting letter of your Spouse's Name?

Cumulative Weight: Q1 + Q2 + Q3 <= Threshold Score

Cumulative Weight: Q4 + Q5 <= Threshold Score

Cumulative Weight: Q6 + Q7 + Q8 <= Threshold Score

FIG. 5

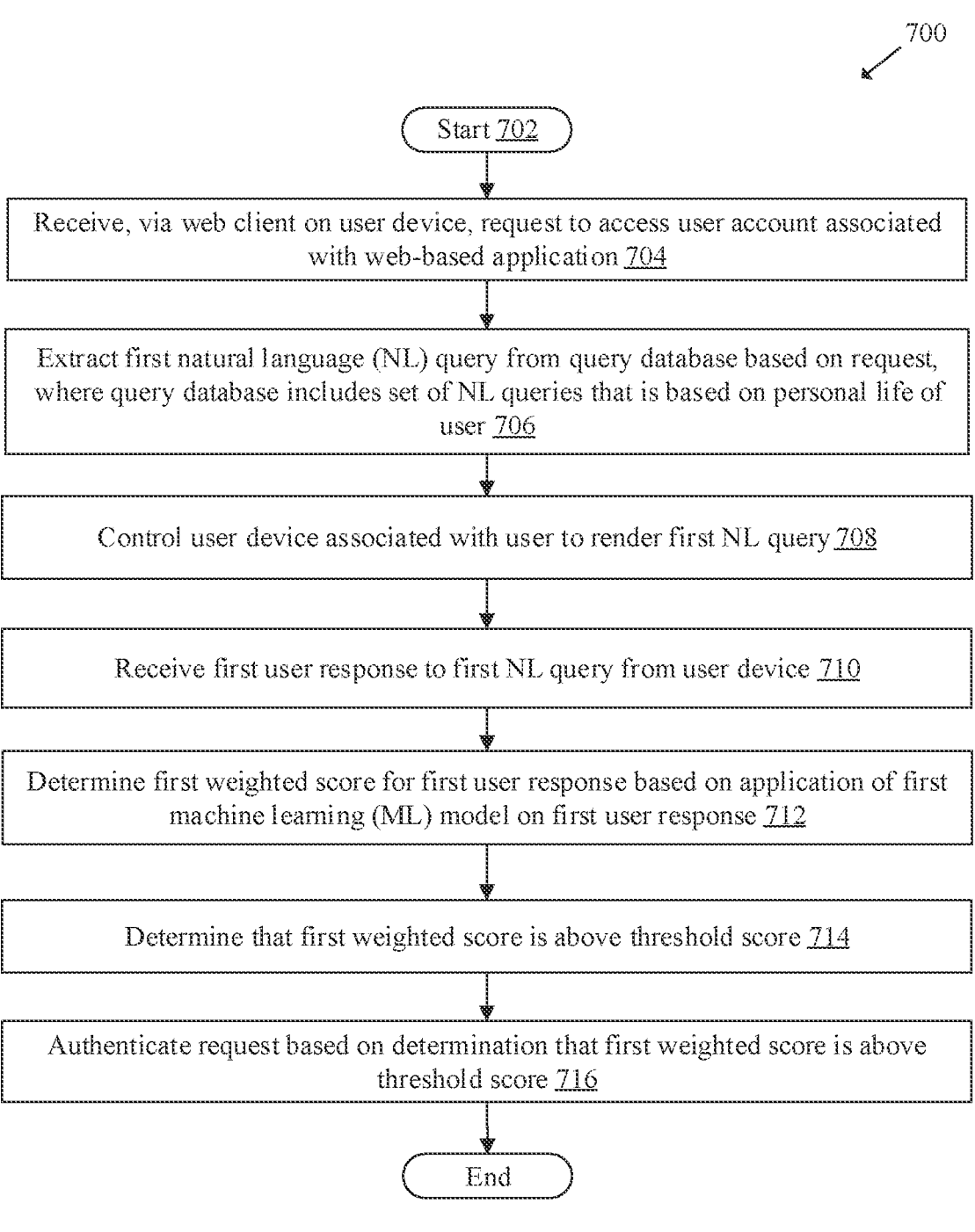

700

Start 702

Receive, via web client on user device, request to access user account associated with web-based application 704

Extract first natural language (NL) query from query database based on request, where query database includes set of NL queries that is based on personal life of user 706

Control user device associated with user to render first NL query 708

Receive first user response to first NL query from user device 710

Determine first weighted score for first user response based on application of first machine learning (ML) model on first user response 712

Determine that first weighted score is above threshold score 714

Authenticate request based on determination that first weighted score is above threshold score 716

End

FIG. 7

TYPE-1 AUTHENTICATION BASED ON AI-GENERATED QUERIES

CROSS-REFERENCE TO RELATED APPLICATIONS/INCORPORATION BY REFERENCE

None.

FIELD

Various embodiments of the disclosure relate to information security and multi-factor authentication. More specifically, various embodiments of the disclosure relate to type-1 authentication based on artificial intelligence (AI)-generated queries.

BACKGROUND

Advancements in the field of information security have led to development of various authentication options. A multifactor authentication (MFA) is one such option that requires a user to provide valid responses to two or more authentication factors to obtain access to a system such as a website or an application. Typically, authentication requests from the user may be authenticated based on at least one of information known to the user (for type-1 authentication factor), information that may be transmitted to devices or included in transaction cards (for type-2 authentication factor), unique features of the user (for type-3 authentication factor), or a location of the user. Type-1 authentication may be used to verify whether the user knows specific information such as passwords or passcodes. Type-2 authentication may be used to verify whether the user has access to the devices where codes or one-time-passwords may be sent or the transaction cards that include codes and card numbers. Type-3 authentication may be used to verify whether the user, requesting access to a machine or a protected space, is a certified, genuine, or is a legitimate user, based on features such as fingerprints or voice pattern of a user. Multi-factor authentication (such as a transaction card and a numeric code, or a password and a passcode) may be preferred over single factor authentication to ensure security.

With type-1 authentication, a major issue is that passwords can be easily guessed or stolen. Some users may use the same password across many accounts, which makes them susceptible to security breaches. Another issue with type-1 authentication is that it is vulnerable to phishing attacks, in which a bad actor impersonates a trustworthy website or service in an effort to deceive consumers into disclosing their login details. Another issue is that type-1 authentication is vulnerable to keylogger malware, which records all keystrokes performed on a computer, including passwords. Thus, type-1 authentication is widely used, but it is considered insecure for many applications and websites.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for type-1 authentication based on artificial intelligence (AI)-generated queries, is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIG. 3 is a diagram that illustrates an exemplary execution pipeline for a generation of a set of natural language (NL) queries for type-1 authentication, in accordance with an embodiment of the disclosure.

FIG. 5 is a diagram that illustrates an exemplary scenario for creation of a graph database based on semantic relationships between pairs of AI-generated NL queries, in accordance with an embodiment of the disclosure.

FIG. 7 is a flowchart that illustrates operations for an exemplary method for type-1 authentication based on AI-generated queries, in accordance with an embodiment of the disclosure.

DETAILED DESCRIPTION

Figure 1:
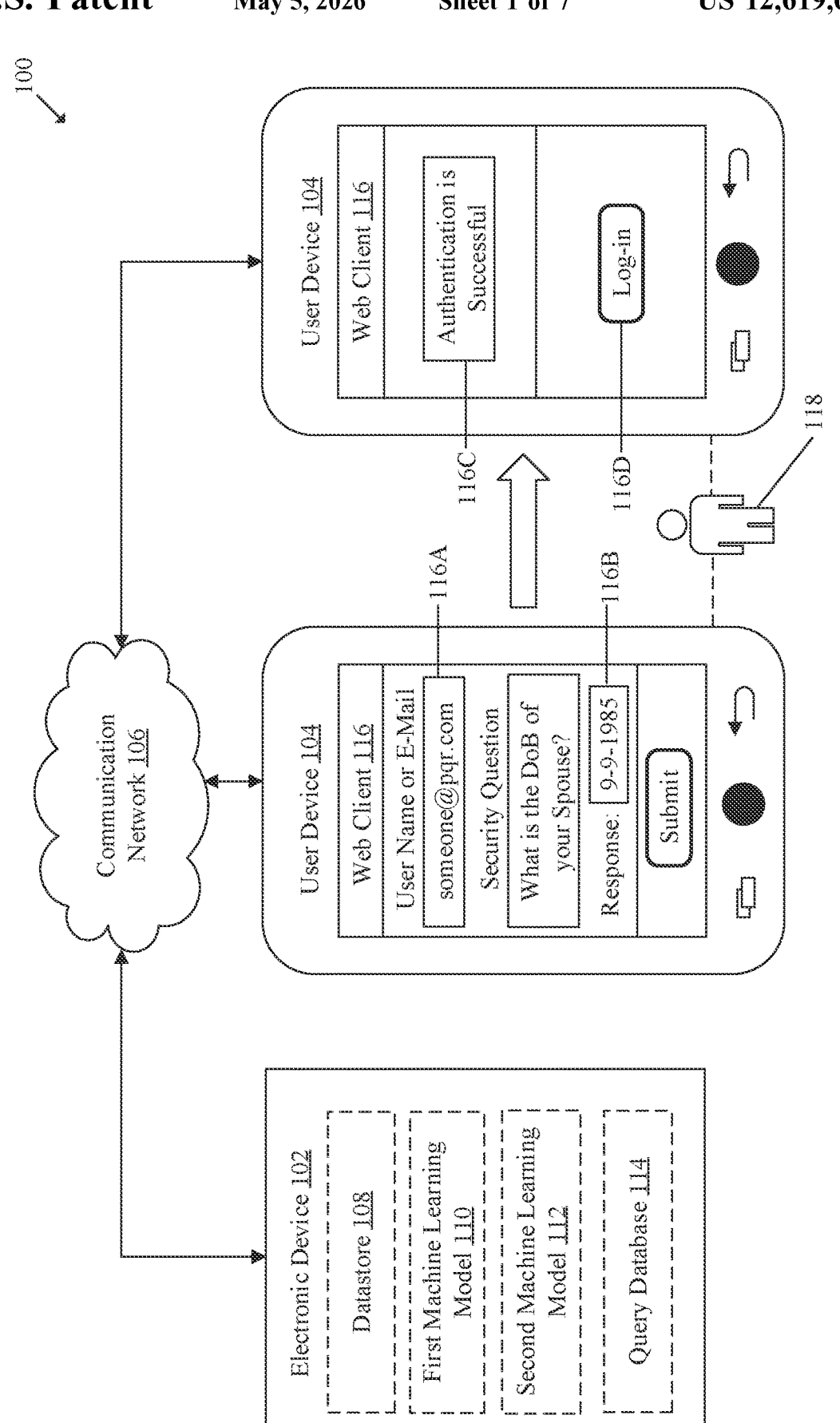
FIG. 1 is a diagram that illustrates an exemplary network environment for type-1 authentication based on artificial intelligence (AI)-generated queries, in accordance with an embodiment of the disclosure.

The following described implementations may be found in a disclosed method for type-1 authentication based on artificial intelligence (AI)-generated queries. Exemplary aspects of the disclosure provide a method that may be implemented in an electronic device (for example, a server) for type-1 authentication based on generation of a set of natural language (NL) queries and evaluation of received user responses to one or more NL queries of the set of NL queries using machine learning (ML) models. The method may include receiving, via a web client on a user device (for example, a personal computer or a smart phone), a request to access a user account associated with a web-based application or a website. The method may include extracting an NL query from a query database based on the request. The query database may include a set of NL queries that may be generated based on information associated with a personal life of the user. The method may include controlling the user device associated with the user to render the extracted NL query on the user device. Further, the method may include receiving a user response to the NL query from the user device and determining a weighted score for the user response based on application of an ML model on the user response. The weighted score may indicate a level of difficulty associated with the NL query and an accuracy of the user response with respect to a NL response for the first NL query in the query database. The method may further include determining that the weighted score is above a threshold score and authenticating the received request based on the determination that the weighted score is above the threshold score.

Typically, users may be required to set and maintain passwords for type-1 authentication. The user passwords may be used to obtain access to an account or avail a service associated with an application or a website. With usage of multiple applications or websites, the user may be required to remember many passwords. Further, each application/website may require that the password is based on a specific set of guidelines or criteria. Such guidelines may ensure that the user sets a complex or lengthy password for securing data (from unauthorized access) that may be stored in an application server, cloud, or a user device. For example, for availing banking-based services using a banking application, the user may be required to set a password that is of a certain length and includes a certain number of types of characters. Further, the password may be required to be reset or changed after a certain number of days/months. It may be cumbersome for a user to update passwords, remember multiple complex passwords, and enter such complex passwords correctly each time for type-1 authentication.

To eliminate the need for the user to remember multiple complex passwords, existing solutions may allow the user to create a password that can be used to access or avail services from multiple applications/websites. A password manager (acting as a third-party) may facilitate the user to create the password and may store the password. The password manager may authenticate the user based on a correct entry of the password by the user once (single sign-on), and multiple applications/websites may accept the user authentication procedure performed by the password manager. However, if the password manager's (i.e., the third-party's) security is compromised (as a result of attacks such as brute-force attacks, man-in-the-middle attacks, dictionary attacks, and so on), the password may be compromised, and confidential or sensitive user data stored on different application servers may be vulnerable to unauthorized access. Once the password is compromised on the password-manager side, the integrity or confidentiality of the user data (which may be stored on servers, the cloud, or user devices) may be compromised using data theft, hacking, or snooping attacks.

To address the abovementioned issues associated with type-1 authentication, the method or electronic device may be configured to render NL queries on a user device and perform type-1 authentication of access or service requests (which may be received from the user), based on user responses to the rendered NL queries. The method may nullify the issues of password remembrance or maintenance, and seamlessly integrated with type-2 or type-3 authentication methods to provide a robust security framework for protection of confidential data. The electronic device may acquire information associated with multiple facets of personal life of a user from one or more trustable data sources or information sources, encrypt the acquired information, and create a user-personal database to store the encrypted acquired information. Similarly, user-personal databases may be created for other users. Thereafter, a set of NL queries and a response to each NL query of the set of NL queries may be generated based on application of a ML model on the acquired information. The set of NL queries and the response to each NL query may be stored in a query database and semantic relationships of each NL query with other NL queries of the set of NL queries (stored in the query database) may be determined. The semantic relationship between a NL query and one or more NL queries may be determined based on whether the NL query and the one or more NL queries have been generated via an application of the ML model on information associated with a same facet or closely related facets of the personal life of the user.

Based on reception of an access request, a first NL query of the set of NL queries may be extracted from the query database for verification of the identity of the user. The first NL query may be rendered on a user device and a user response to the rendered first NL query may be received. The received response may be evaluated based on an application of another ML model on the received response for determination a weighted score. The weighted score may be indicative of an accuracy of the received response with respect to a response of the first NL query stored in the query database. If the determined weighted score is above a threshold score the access request may be authenticated and a token may be issued. Thus, the user may be authenticated based on information associated with the personal life of the user (that may be known to the user) and, hence, the user may not be required to remember passwords (for getting the access request authenticated). On the other hand, if the weighted score is below the threshold score a semantic relationship between the first NL query and a second NL query of the set of NL queries may be leveraged for extraction of the second NL query from the query database. Thereafter, the second NL query may be rendered on the user device and the access request may be authenticated based on evaluation of a received response to the second NL query. The authentication of the access request based on user responses to randomly extracted NL queries may ensure that authentication parameter (i.e., the NL queries used for authenticating the access request) is dynamic and impervious to attacks (such as brute-force attacks, man-in-the-middle attacks, dictionary attacks, and so on).

FIG. 1 is a diagram that illustrates an exemplary network environment for type-1 authentication based on artificial intelligence (AI)-generated queries, in accordance with an embodiment of the disclosure. With reference to FIG. 1, there is shown a network environment 100. The network environment 100 includes an electronic device 102 and a user device 104. The electronic device 102 may communicate with the user device 104 through a communication network 106. The electronic device 102 may include a datastore 108, a first machine learning (ML) model 110, a second ML model 112, and a query database 114. The user device 104 may include a web client 116 that may render AI-generated natural language (NL) queries, receive user responses to the AI-generated NL queries, and indicate whether type-1 authentication is successful. There is further shown a user 118 who may be associated with the user device 104. The electronic device 102 may receive requests from the user 118 via the web client 116 to access a user account.

The electronic device 102 may include suitable logic, circuitry, interfaces, and/or code that may be configured to manage authentication of access requests received from one or more users. For the authentication, NL queries that may be based on the personal life of the user 118 may be extracted from the query database 114 and may be rendered in a sequence or based on rules) as security questions to verify the identity of the user 118. Any access request from the user 118 may be authenticated based on an evaluation of user responses (evaluated using the first ML model 110) to such queries. Examples of the electronic device 102 may include, but may not be limited to, a computing device, a smartphone, a personal computer, a wearable device, a server, a mainframe machine, or a computer workstation.

In accordance with an embodiment, the electronic device 102 may be a server (for example, a web-based application server). The electronic device 102 may receive a request from the user device 104 (i.e., the user 118) to access a user account. Based on the received request, the electronic device 102 may randomly extract an AI-generated NL query (from the query database 114) and transmit the extracted AI-generated NL query to the electronic device 102 based the received request. The electronic device 102 may further receive a user response to the transmitted AI-generated NL query. Based on an evaluation of the user response (using the first ML model 110), the electronic device 102 may authenticate the request. In some embodiments, based on the evaluation, the electronic device 102 may extract an additional AI-generated NL query (from the query database 114), transmit the AI-generated NL query, and authenticate the request based on a received response to the additional AI-generated NL query. Thereafter, the electronic device 102 may transmit (to the user device 104) a message indicative of a successful authentication of the request. The electronic device 102 may execute operations through web applications, cloud applications, HTTP requests, repository operations, file transfer, and the like. Example implementations of the electronic device 102 may include, but are not limited to, a database server, a file server, a web-based server, an application server, a mainframe server, a cloud computing server, or a combination thereof. In at least one embodiment, the electronic device 102 may be implemented as a plurality of distributed cloud-based resources by use of several technologies that are well known to those ordinarily skilled in the art.

The user device 104 may include suitable logic, circuitry, interfaces, and/or code that may be configured to receive control instructions from the electronic device 102. The user device 104 may render, based on the received control instructions, the AI-generated NL queries and user interface elements of the web client 116 that allow the user 118 to enter and submit responses to such queries. The user device 104 may receive responses to the rendered NL queries via the user interface elements of the web client 116. The user device 104 may be further configured to transmit the user responses to the electronic device 102 via the communication network 106. Examples of the user device 104 may include, but may not be limited to, a computing device, a smartphone, a mobile phone, a tablet, a smart wearable device, a mainframe machine, an IoT device, and/or a CE device.

The communication network 106 may include a communication medium through which the electronic device 102 and the user device 104 may communicate with each other. The communication network 106 may be a wired or wireless communication network. Examples of the communication network 106 may include, but are not limited to, Internet, a Wireless Fidelity (Wi-Fi) network, a Personal Area Network (PAN), a Local Area Network (LAN), or a Metropolitan Area Network (MAN). The electronic device 102 may be configured to connect to the communication network 106 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The datastore 108 may include suitable logic, circuitry, interfaces, and/or code that may be configured to store information associated with the personal life of the user 118. For example, the information may include a date of birth of the user 118, a birthplace, a name of father/mother of the user 118, an educational qualification of the user 118, a marital status of the user 118, and so on. The information may be provided by the user 118 or obtained from one or more data sources (such as educational institutions, corporate institutions, or government-controlled servers that store information associated with citizens) based on prior agreements with the one or more trustable sources. The agreements may ensure that privacy of the obtained information is protected and not distributed for any monetary benefit or malicious intent. The obtained information may be stored in the datastore 108 in an encrypted format. The datastore 108 may be further configured to store a set of key-value pairs extracted based on the information stored in the datastore 108. The datastore 108 may be further configured to store a paragraph that may be extracted from each key-value pair of the set of key-value pairs.

Each of the first ML model 110 and the second ML model 112 may be a computational network or a system of artificial neurons that may be arranged in a plurality of layers. The plurality of layers (of the first ML model 110 and the second ML model 112) may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers. Outputs of each hidden layer may be coupled to inputs of at least one node in other layers. Node(s) in the final layer may receive inputs from at least one hidden layer to output a result. The number of layers and the number of nodes in each layer of the first ML model 110 may be determined from hyper-parameters of the first ML model 110. Similarly, the number of layers and the number of nodes in each layer of the second ML model 112 may be determined from hyper-parameters of the second ML model 112. Such hyper-parameters may be set before or after training the first ML model 110 or the second ML model 112 on a training dataset.

Each node (of the first ML model 110 and the second ML model 112) may correspond to a mathematical function (e.g., a sigmoid function or a rectified linear unit) with a set of parameters, tunable during training of each of the first ML model 110 and the second ML model 112. The set of parameters may include, for example, a weight parameter, a regularization parameter, and the like. Each node may use the mathematical function to compute an output based on one or more inputs from nodes in other layer(s) (e.g., previous layer(s)) of the first ML model 110 or the second ML model 112. All or some of the nodes of each of the first ML model 110 or the second ML model 112 may correspond to same mathematical functions or different mathematical functions. In training of the first ML model 110, one or more parameters of each node of the first ML model 110 may be updated based on whether an output of the final layer for a given input (from the training dataset) matches a correct result based on a loss function for the first ML model 110. Similarly, in training of the second ML model 112, one or more parameters of each node of the second ML model 112 may be updated based on whether an output of the final layer for a given input (from the training dataset) matches a correct result based on a loss function for the second ML model 112. The above process may be repeated for same or a different input until a minima of loss function is achieved, and a training error is minimized. Several methods for training are known in art, for example, gradient descent, stochastic gradient descent, batch gradient descent, gradient boost, meta-heuristics, and the like.

Each of the first ML model 110 and the second ML model 112 may include electronic data, which may be implemented as, for example, a software component of an application executable on the electronic device 102. Each of the first ML model 110 and the second ML model 112 may rely on libraries, external scripts, or other logic/instructions for execution by a processing device, such as the electronic device 102. The first ML model 110 may function as a machine learning model with a capability to perform a machine learning task of evaluation of a user response to an AI-generated NL query. The first ML model 110 may be trained based on AI-generated NL queries and NL responses to the AI-generated NL queries. The trained first ML model 110 may be used to determine an accuracy of a user response that may be received from the user device 104. The determination may be based on an application of trained first ML model 110 on the user response. The accuracy may indicate a degree of similarity between the received user response and an actual NL response of the AI-generated NL query (which may be stored in the electronic device 102). The electronic device 102 may apply the first ML model 110 on the received user response (input) for generation of an output value, which may be indicative of the accuracy of the received user response. In an embodiment, the first ML model 110 may be retrained or fine-tuned based on the received user response.

The second ML model 112 may function as a machine learning model with a capability to perform a machine learning task of generation of a set of NL queries. The second ML model 112 may be trained based on paragraphs and NL queries that may be extracted from the paragraphs. The electronic device 102 may be configured to apply the second ML model 112 on a paragraph (generated based on a key-value pair extracted based on information associated with the personal life of the user 118). The second ML model 112 may generate, as an output, NL queries (i.e., the AI-generated NL queries) from the paragraph. Each NL query (generated as an output) may be semantically related to other generated NL queries.

In accordance with an embodiment, each of the first ML model 110 and the second ML model 112 may be implemented using hardware including a processor, a microprocessor (e.g., to perform or control performance of one or more operations), a field-programmable gate array (FPGA), or an application-specific integrated circuit (ASIC). Alternatively, in some embodiments, each of the first ML model 110 and the second ML model 112 may be implemented using a combination of hardware and software. Examples of the first ML model 110 or the second ML model 112 may include, but are not limited to, a Deep Neural Network (DNN), a recurrent neural network, a long-short term memory (LSTM) network, a language model that uses a transformer model, a generative transformer network, a convolutional neural network (CNN), and/or a combination of such networks. (DNNs). In some embodiments, each of the first ML model 110 and the second ML model 112 may correspond to a learning engine that may execute numerical computation using data flow graphs.

The query database 114 may be configured to store a set of AI-generated NL queries and a set of NL responses corresponding to the set of AI-generated NL queries. In accordance with an embodiment, the query database 114 may be a graph database. The query database 114 may further store semantic relationships between each pair of AI-generated NL queries of the set of AI-generated NL queries and weights assigned to each AI-generated NL queries of the set of AI-generated NL queries. The query database 114 may be a relational database, a graph database, a non-relational database (for example, a database that uses a semi-structure data format such as Javascript Object Notation (JSON) or Extended Markup Language (XML)), or a set of comma-separated values (csv) files in a storage. The query database 114 may be stored or cached on a device, such as the electronic device 102. A first AI-generated NL query of the set of AI-generated NL queries may be extracted from the query database 114 and an actual NL response of the first AI-generated NL query stored in the query database 114 may be used for evaluation of a user response received for the first AI-generated NL query. Based on the evaluation of the user response, the query database 114 may be updated or a second AI-generated NL query may be extracted from the query database 114. The second AI-generated NL query may be semantically related to the first AI-generated NL query.

In some embodiments, the query database 114 may be hosted on a plurality of servers stored at same or different locations. The operations of the query database 114 may be executed using hardware, including but not limited to, a processor, a microprocessor, a field-programmable gate array (FPGA), or an application-specific integrated circuit (ASIC).

The web client 116 may be a software executable on the user device 104. The web client 116 may be controlled by the electronic device 102 to render AI-generated NL queries for type-1 authentication of a request to access a user account, user interface elements for reception of user responses to the rendered AI-generated NL queries, and messages indicative of whether the type-1 authentication of the request is successful. An exemplary implementation of the web client 116 may be a web browser or a mobile application.

In operation, the electronic device 102 may be configured to receive, via the web client 116 on the user device 104, a request to access a user account associated with a web-based application. The web client 116 may render a user interface associated with the web-based application that may allow the user 118 to access or avail services offered by the web-based application. The electronic device 102 may control an execution of the web client 116 on the user device 104 for rendering the user interface. The user interface may include one or more user interface elements via which user inputs may be received (from the user 118) to sign-up for a user account or sign-in to the user account associated with the web-based application. For example, the electronic device 102 may control the web client 116 to render a user interface element 116A (for example, a textbox) for reception of the request. As shown, for example, the request may include a username or an email address such as someone@pqr.com). The web client 116 may transmit the request received via the user interface element 116A to the electronic device 102. On reception of the request, the electronic device 102 may determine that the user 118 intends to access the user account associated with the web-based application.

The electronic device 102 may be further configured to extract a first NL query (i.e., an AI-generated NL query) from the query database 114 based on the received request. The query database 114 may include a set of NL queries that may be generated based on information associated with a personal life of the user 118. The electronic device 102 may obtain the information from multiple information sources. The information may include, for example, details associated with the birth of the user 118 (such as a place of birth or a date of birth), family members of the user 118 (such as number of siblings, date of birth of father, father's education qualification, or mother's maiden name), contacts of the user 118, and people associated with the user 118 (such as an Email address of the user 118, an Email address of a family member, or a telephone number of a family member), addresses of the user 118 (such as a residential address or an official address), an academic history of the user 118 (such as highest qualification, year of admission at university, or name of graduation university), relationships of the user 118 (such as year of marriage, wife's name, or wife's birthday), user preferences and interests (such as a preferred dish, show, vacation destination, or hobby), and the like. The electronic device 102 may store the information in the datastore 108 in an encrypted format.

In accordance with an embodiment, the electronic device 102 may extract a set of key-value pairs based on the information. Each key-value pair of the set of key-value pairs may be extracted based on an aspect of the information. For example, based on the date of birth of the user 118 (i.e., an aspect of the information associated with the personal life of the user 118), the electronic device 102 may extract a key-value pair as DOB:27-11-1977. The key may be "DOB" and a value associated with the key may be "27-11-1977" (in DD-MM-YYYY format). The electronic device 102 may be further configured to generate a paragraph based on each key-value pair of the set of key-value pairs using a paraphraser model. The paraphraser model may be a pre-trained language model (such as a neural network model) stored in the electronic device 102. Thus, a set of paragraphs may be generated based on the set of key-value pairs. Based on the exemplary key-value pair DOB:27-11-1977, the paraphraser model may generate a paragraph "User was born on $27^{th}$ day of the month of November in the year 1977". The electronic device 102 may be further configured to generate the set of NL queries based on an application of the second ML model 112 on the set of paragraphs. A subset of the set of NL queries, associated with an aspect of the personal life of the user 118 may be generated from each paragraph of the set of paragraphs. For example, based on the abovementioned example paragraph, the electronic device 102 may generate a subset of NL queries associated with the date of birth of the user 118. The generated subset of NL queries may include queries, such as "What is your month of birth?", "On which date you were born?", or "What is your year of birth?". Similarly, the electronic device 102 may generate additional subsets of NL queries based on the other aspects of the personal life of the user 118 for the generation of the set of NL queries. Once the set of NL queries is generated, the electronic device 102 may store the set of NL queries in the query database 114.

The extraction of the first NL query may be based on selection of the first NL query from the set of NL queries stored in the query database 114. For example, the extracted first NL query may be "what is the date of birth of your spouse?". After the extraction, a verification test (i.e., a Type 1 authentication test) may be performed using one or more NL queries to verify that the user 118 is a valid user of the user account and the request to access the user account is a valid request from the valid user.

As part of the verification test, the electronic device 102 may be further configured to control the user device 104 associated with the user 118 to render the extracted first NL query. In accordance with an embodiment, the electronic device 102 may control the web client 116 to render the first NL query on the user interface associated with the web-based application. The web client 116 may be further render a user interface element 116B (for example, a textbox) on the user interface for reception of a user response to the extracted first NL query. In response to the first NL query, the electronic device 102 may be configured to receive a first user response from the user device 104. The first user response may be received from the web client 116 on the user device 104. For example, the first user response to the first NL query (i.e., "what is the date of birth of your spouse?") may be "9-9-1985". The web client 116 may transmit the first user response to the electronic device 102 via a network interface on the user device 104 based on reception of the first user response via the user interface element 116B.

The electronic device 102 may be further configured to determine a first weighted score for the first user response based on an application of the first ML model 110 on the received first user response. The first weighted score may be determined for evaluation of the first user response and may indicate a level of difficulty associated with the first NL query and/or an accuracy of the first user response with respect to a NL response (i.e., an actual response) for the first NL query in the query database 114.

In accordance with an embodiment, each NL query of the set of NL queries may be associated with a certain "level of difficulty" that may be represented by a value. A higher value may be indicative of a higher "level of difficulty. Similarly, a lower value may be indicative of a lower "level of difficulty". The value of a "level of difficulty" associated with the first NL query ("what is the date of birth of your spouse?") may be sufficiently high since it may be difficult for a malicious actor to obtain or guess the date of birth of the spouse of the user 118 compared to the date of birth of the user 118. The first weighted score (e.g., a value between 0 and 1) may be directly proportional to the value of the "level of difficulty" associated with the first NL query.

In accordance with an embodiment, the electronic device 102 may determine, based on an output of the first ML model 110, the accuracy of the received first user response with respect to the actual NL response for the first NL query. The accuracy of the received first user response may be represented by a value, which may be determined as the output of the first ML model 110. The output value may depend on whether the first ML model 110 is trained to determine a hard accuracy or a soft accuracy. For example, the value may be determined as '1' (irrespective of whether the first ML model 110 is trained to determine hard accuracy or soft accuracy) based on a determination of an exact match between the first user response and the NL response (i.e., a true response) for the first NL query stored in the query database 114. The first weighted score may be directly proportional to a value that represents the accuracy of the received first user response with respect to the NL response. Thus, the first weighted score may be dependent on the "level of difficulty" associated with the first NL query if the received first user response is accurate.

The electronic device 102 may be further configured to determine that the first weighted score is above a threshold score. The first weighted score may be determined to be above the threshold score if the level of difficulty associated with the first NL query is high (such that the first weighted score is above the threshold score) and the first user response is accurate. The electronic device 102 may determine the first user response (i.e., "9-9-1985") as accurate based on an exact match between the first user response and the (actual) NL response for the first NL query ("what is the date of birth of your spouse?") stored in the query database 114.

In accordance with an embodiment, the electronic device 102 may determine that the first weighted score is less than the threshold score if the "level of difficulty" associated with the first NL query is low (even if a first user response is accurate). For example, the first weighted score may be less than the threshold score if the extracted first NL query is "what is your date of birth?". The "level of difficulty" associated with the NL query "what is the date of birth of your spouse?" may be higher compared to that of the NL query "what is your date of birth?". If the first weighted score is less than the threshold score, then the electronic device 102 may extract a second NL query of the set of NL queries from the query database 114 and may control the user device 104 to render the second NL query. The extraction of the second NL query may be based on a semantic relationship between the first NL query and the second NL query. Additionally, or alternatively, the extraction of the second NL query may be based on the first user response. Thereafter, based on a reception of a second user response to the second NL query (from the user device 104), the electronic device 102 may determine a second weighted score for the second user response. The electronic device 102 may continue to extract NL queries of the set of NL queries until a sum of weighted scores (such as a sum of the first weighted score and the second weighted score) is determined to be above the threshold score. Additionally, or alternatively, if the sum of weighted scores is below the threshold score for a predefined number of questions (e.g., a set of 5 questions), then the request to access the user account may be rejected and the user 118 may be determined to have failed the verification test.

The electronic device 102 may be further configured to authenticate the request based on the determination that the first weighted score is above the threshold score. The first weighted score may be indicative of a degree of confidence of the electronic device 102 (or the first ML model 110) on the authenticity of the request to access the user account. In accordance with an embodiment, the electronic device 102 may control the web client 116 on the user device 104 to render a user interface element 116C to indicate that the authentication of the request (for access to the user account associated with the web-based application) is successful. The electronic device 102 may control the web client 116 to further render a user interface element 116D (for example, a radio button "log-in) to allow the user 118 to log-in to the user account. In some embodiments, the electronic device 102 may issue a token (such as a Security Assertion Markup Language (SAML) message), to the web client 116, that indicates successful authentication of the request for access to the user account.

In some embodiments, the electronic device 102 may be further configured to update one or more weight parameters of at least one intermediate layer or the output layer of the first ML model 110 based on the authentication of the request and the first weighted score. For example, the first weighted score or a sum of weighted scores for a number of NL queries may be used to define an auxiliary loss for the first ML model 110. The first ML model 110 may be fined tuned based on the auxiliary loss.

Figure 2:
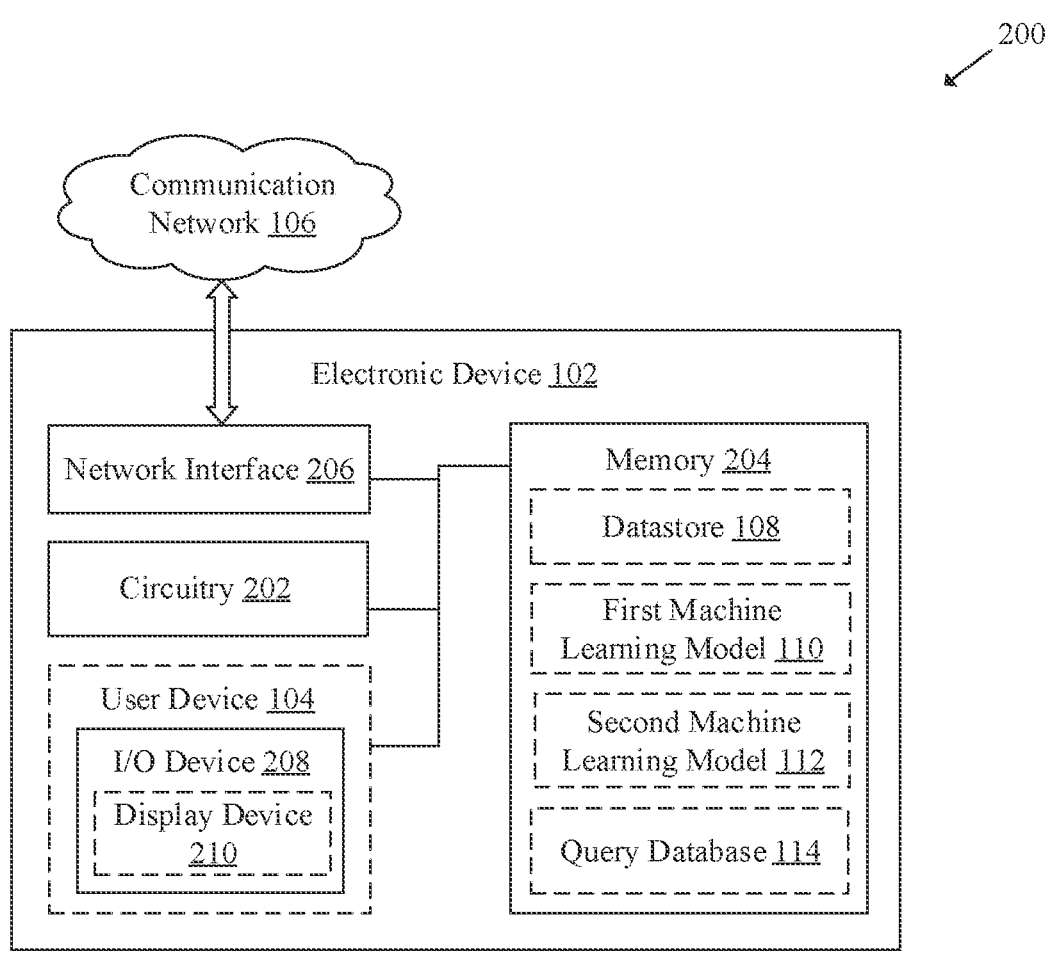
FIG. 2 is a block diagram that illustrates an exemplary electronic device for type-1 authentication based on AI-generated queries, in accordance with an embodiment of the disclosure.

FIG. 2 is a block diagram that illustrates an exemplary electronic device for type-1 authentication based on AI-generated queries, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202, a memory 204, and a network interface 206. In at least one embodiment, the memory 204 may include the datastore 108, the first ML model 110, the second ML model 112, and the query database 114. In at least one embodiment, the electronic device 102 may further include the user device 104. The user device 104 may include an input/output (I/O) device 208. The I/O device 208 may include a display device 210. The circuitry 202 may be communicatively coupled to the memory 204, the network interface 206, and the user device 104, through wired or wireless communication of the electronic device 102.

The circuitry 202 may include suitable logic, circuitry, and interfaces that may be configured to execute program instructions associated with as set of operations to be executed by the electronic device 102. The set of operations include reception, via the web client 116 on the user device 104, a request to access a user account associated with a web-based application, extraction of a first NL query from the query database 114 that includes a set of NL queries, controlling of the user device 104 associated with the user 118 to render the first NL query, reception of a first user response to the first NL query from the user device 104, determination of a first weighted score for the first user response based on application of the first ML model 110 on the first user response, determination that the first weighted score is above a threshold score, and authentication the request based on the determination that the first weighted score is above the threshold score. The circuitry 202 may include one or more specialized processing units, which may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 204 may include suitable logic, circuitry, and/or interfaces that may be configured to store instructions executable by the circuitry 202. The memory 204 may be configured to store operating systems and associated applications. The memory 204 may be configured to store the datastore 108, the first ML model 110, the second ML model 112, and the query database 114. In at least one embodiment, the memory 204 may store information associated with the personal life of the user 118, a set of key-value pairs extracted from the information, and a set of paragraphs generated from the set of key-value pairs. The query database 114 may store a set of NL queries generated from the set of paragraphs and a set of NL responses to the set of NL queries. Example implementations of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 206 may include suitable logic, circuitry, interfaces, and/or code that may be configured to establish a communication between the electronic device 102 and the user device 104, via the communication network 106. The network interface 206 may be implemented by use of various known technologies to support wired or wireless communication of the electronic device 102 with the communication network 106. The network interface 206 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 206 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), Wi-MAX, a protocol for email, instant messaging, and/or Short Message Service (SMS).

The I/O device 208 (in the user device 104) may include suitable logic, circuitry, interfaces, and/or code that may be configured to receive a user input indicative of a request to access a user account associated with a web-based application. The I/O device 208 may be further render, as an output, the first NL query of the set of NL queries based on the received request. The I/O device 208 may be further receive a user input indicative of the first response to the first NL query. The I/O device 208 may be further render a message indicative of whether authentication of the request is successful and a user interface element that enables the user 118 to log-in to the user account. The I/O device 208 may include various input and output devices, which may be configured to communicate with the circuitry 202. Examples of the input devices may include, but are not limited to, a touch screen, a keyboard, a mouse, a joystick, and/or a microphone. Examples of the output devices may include, but are not limited to, a display device (such as the display device 210).

The display device 210 may include suitable logic, circuitry, interfaces, and/or code that may be configured to render the set of NL queries, outcome of evaluation of user responses to the rendered set of NL queries, and user interface elements that enable the user 118 to request access to the user account and log-in to the user account (if the request for access to the user account is successful). In accordance with an embodiment, the display device 210 may include a touch screen to receive the user input. The display device 210 may be realized through several known technologies such as, but not limited to, a Liquid Crystal Display (LCD) display, a Light Emitting Diode (LED) display, a plasma display, and/or an Organic LED (OLED) display technology, and/or other display technologies. In accordance with an embodiment, the display device 210 may refer to a display screen of smart-glass device, a 3D display, a see-through display, a projection-based display, an electro-chromic display, and/or a transparent display.

The operations executed by the electronic device 102, as described in FIG. 1, may be performed by the circuitry 202. Operations executed by the circuitry 202 are described in detail, for example, in FIGS. 3, 4, 5, and 6.

FIG. 3 is a diagram that illustrates an exemplary execution pipeline for a generation of a set of NL queries for type-1 authentication, in accordance with an embodiment of the disclosure. FIG. 3 is explained in conjunction with elements from FIG. 1 and FIG. 2. With reference to FIG. 3, there is shown an exemplary execution pipeline 300. The exemplary execution pipeline 300 may include a sequence of operations that may be executed by the circuitry 202 of the electronic device 102 of FIG. 1 for generation of the set of NL queries. The sequence of operations may start at 302 and terminate at 312.

At 302, personal information associated with the personal life of the user 118 may be received. In at least one embodiment, the circuitry 202 may be configured to receive the personal information associated with the personal life of the user 118. The personal information may be received from information sources (or data sources) and may be associated with multiple aspects (such as birth, preferences, contacts, addresses, relationships, education, or career) of the personal life of the user 118. For example, the received personal information may include details associated with birth (such as the date of birth of the user 118), details associated with career (such as name of an organization where the user 118 works (or has worked), date of joining of the user 118 (at the organization), name of a co-worker who had joined the same organization on the same date, and so on).

At 304, a set of key-value pairs 304A may be extracted based on the personal information associated with the personal life of the user 118. In at least one embodiment, the circuitry 202 may be configured to extract the set of key-value pairs 304A based on the personal information. Each key-value pair of the set of key-value pairs 304A may include a key field that may indicate a particular aspect of the personal life of the user 118 and a value field that may indicate information associated with the particular aspect. For example, the set of key-value pairs 304A may include "DOB:31-12-1981" (extracted based on the birth details), "organization: XYZ" (extracted based on the career details), and "DOJ:21-04-2000" (extracted based on the career details). The set of key-value pairs 304A is shown to include three key-value pairs merely as an example and such an example should not be construed as limiting the disclosure. The set of key-value pairs 304A may include any number of key-value pairs extracted based on diverse aspects of the personal life of the user 118. For the key-value pair "DOB: 31-12-1981", the key may be "DOB" (i.e., date of birth of the user 118) and the value may be "31-12-1981". Similarly, keys in other key-value pairs of the set of key-value pairs 304A may be "organization" (where the user 118 works or has worked in past) and "DOJ" (i.e., a date on which the user 118 joined the organization). The associated values for such keys may be "XYZ" (i.e., the name of the organization) and "31-12-1981", respectively.

At 306, a set of paragraphs 306A may be generated based on the set of key-value pairs 304A. In at least one embodiment, the circuitry 202 may be configured to generate the set of paragraphs 306A based on the set of key-value pairs 304A. The set of paragraphs 306A may be generated based on an application of a paraphraser model on the set of key-value pairs 304A. The paraphraser model may be a natural language processing (NLP)-based ML model that may be trained based on a training dataset that includes the set of key-value pairs 304A. Each paragraph of the set of paragraphs 306A may be associated with a key-value pair of the set of key-value pairs 304A and may correspond to an aspect of the personal life of the user 118. For example, the set of paragraphs 306A may include a paragraph "User was born on 31st day of December month in the year 1981" that may be associated with the key-value pair "DOB: 31-12-1981" and may correspond to the birth details of the user 118. The set of paragraphs 306A may further include a paragraph "User works at organization XYZ" that may be associated with the key-value pair "organization: XYZ" and may correspond to the career details of the user 118. The set of paragraphs 306A may further include a paragraph "User joined XYZ on $21^{st}$ day of April month, in the year 2000" that may be associated with the key-value pair "DOJ: 21-04-2000" and may correspond to the career details of the user 118. The set of paragraphs 306A is shown to include three paragraphs merely as an example and such an example should not be construed as limiting the disclosure. In certain embodiments, the set of paragraphs 306A may include any number of paragraphs that may be generated based on other key-value pairs of the set of key-value pairs 304A.

At 308, a set of NL queries 308A may be generated based on the set of paragraphs 306A. In at least one embodiment, the circuitry 202 may be configured to generate the set of NL queries 308A based on the set of paragraphs 306A. The circuitry 202 may be further configured to generate a set of NL responses for the set of NL queries based on the set of paragraphs 306A. Each NL response of the set of NL responses may be an actual or a true response (i.e., a ground truth) for an NL query of the set of NL queries 308A. The set of NL queries 308A and the set of NL responses may be stored in the query database 114.

In accordance with an embodiment, the set of NL queries 308A and the set of NL responses may be generated based on an application of the second ML model 112 on the set of paragraphs 306A. The set of NL queries 308A may include multiple subsets of NL queries. A subset of NL queries may be generated for each paragraph of the set of paragraphs 306A based on the application of the second ML model 112 on the corresponding paragraph. The second ML model 112 may be trained based on the set of paragraphs 306A. Based on the training, the second ML model 112 may receive a paragraph of the set of paragraphs 306A as an input and may generate (as output) a subset of NL queries and a subset of NL responses for the subset of NL queries. By way of example, and not limitation, the second ML model 112 may be applied on the paragraph (i.e., the input) "User was born on 31st day of December month, in the year 1981" to generate a subset of NL queries such as "In which year were you born?", "In which month were you born?", or "on which date were you born?" and a subset of NL responses such as "1981", "December", and "31/12/1981". Similarly, a NL query "Where do you work?" and an NL response "XYZ" may be generated based on an application of the second ML model 112 on the paragraph "User works at organization XYZ". Further, a subset of NL queries such as "In which year you joined XYZ?", "In which month you joined XYZ?", and "On which date did you join XYZ?"; and a corresponding subset of NL responses such as "2000", "April", and "21/04/2000" may be generated based on an application of the second ML model 112 on the paragraph "User joined XYZ on 21st day of April month, in the year 2000".

In some embodiments, the set of NL queries 308A may include NL queries that may be generated based on information associated with personal lives of other users. Such NL queries may be included in the set of NL queries 308A based on a match or similarity detected between key-value pairs extracted based on personal information associated with the user 118 and that of the other users. For example, the circuitry 202 may receive details associated with a career of a user "ABC". The details may include a date of joining of the user "ABC" in the organization "XYZ" as "21-04-2000". The circuitry 202 may extract a key-value pair "DOJ: 21-04-2000" based on the career details of the user "ABC". Thereafter, a match may be detected between key-value pairs extracted based on personal information associated with the personal lives of the user 118 and the user "ABC" (since a key-value pair "DOJ: 21-04-2000" has been extracted based on the career details of the user 118). The circuitry 202 may further generate a paragraph "User and ABC joined XYZ on $31^{st}$ day of April month, in the year 2000. It has been 22 years since User and ABC joined XYZ" based on an application of the paraphrasing model on the extracted key-value pair. Based on the paragraph, the circuitry 202 may generate a subset of NL queries and a subset of corresponding NL responses based on the application of the second ML model 112 on the paragraph. The subset of NL queries may include queries such as "Who joined XYZ with you?", "On which date did ABC join XYZ?", and "For how many years you and ABC have been working in XYZ?". The subset of NL responses may include "ABC", "21/04/2000", "22", respectively for the subset of NL queries. In FIG. 3, the set of NL queries 308A is shown to include ten NL queries merely as an example and such an example should not be construed as limiting the disclosure. In certain embodiments, the set of NL queries 308A may include any number of NL queries.

At 310, a semantic relationship between each pair of NL queries of the set of NL queries 308A may be determined. In at least one embodiment, the circuitry 202 may be configured to determine the semantic relationship between each pair of NL queries of the set of NL queries 308A based on at least one paragraph of the set of paragraphs 306A. The semantic relationship between each pair of NL queries of the set of NL queries 308A or between each pair of paragraphs of the set of paragraphs 306A may be determined based on a semantic analysis (i.e., a classification task or a natural language understanding (NLU) task) of each NL query or each paragraph using ML models (that may be stored in the memory 204 of the electronic device 102). The circuitry 202 may be configured to determine a strength of a semantic relationship between a pair of NL queries (or a pair of paragraphs) based on a similarity between outcomes of semantic analyses of individual NL queries of the pair of NL queries (or individual paragraphs of the pair of paragraphs).

In accordance with an embodiment, the ML models may include a semantic classification model and a semantic extraction model. The semantic classification model may be used for categorization of the NL queries in the set of NL queries 308A or the paragraphs in the set of paragraphs 306A, based on the generation of the NL queries, or the paragraphs, from information that may be associated with a certain aspect of personal life of the user 118. For example, three NL queries (of the set of NL queries 308A) extracted based on birth details may be classified into a first category, two NL queries extracted based on career details may be classified into a second category, and so on. The semantic extraction model may be used for extraction of specific information from the NL queries or the paragraphs. The ML models may be further used for detection of collocations and determination of relationships between lexical items in each NL query or each paragraph.

Based on the semantic analysis, the circuitry 202 may determine that each pair of NL queries of a subset of NL queries generated from the same paragraph may be semantically related to each other. For example, the circuitry 202 may determine that pairs of NL queries in a first subset of NL queries 310A may be related semantically (since the NL queries of the first subset of NL queries 310A may be generated based on the paragraph "User was born on 31st day of December month, in the year 1981"). Similarly, pairs of NL queries in a second subset of NL queries 310B may be related semantically (since the NL queries of the second subset of NL queries 310B may be generated based on the paragraph "User and ABC joined XYZ on $31^{st}$ day of April month, in the year 2000. It has been 22 years since User and ABC joined XYZ").

The circuitry 202 may further determine that one or more pairs of paragraphs of the set of paragraphs 306A are related semantically. This may be due to extraction of at least two key-value pairs (of the set of key-value pairs 304A) from personal information associated with a single aspect or similar aspects (for example, marriage and children) of the personal life of the user 118. For example, the circuitry 202 may determine that the paragraphs "User works at organization XYZ" and "User joined XYZ on $21^{st}$ day of April month, in the year 2000" are related semantically. The determination may be based on generation of the paragraphs using key-value pairs "Organization: XYZ" and "DOJ: 21-04-2000". Both key-value pairs may be extracted based on the career details (i.e., same aspect of personal life) of the user 118. In such a scenario, the circuitry 202 may be configured to determine that NL queries generated based on the paragraphs may be semantically related. Based on the abovementioned example, the circuitry 202 may determine that each pair of NL queries of a third subset of NL queries 310C may be semantically related.

In accordance with an embodiment, the circuitry 202 may be further configured to determine that a first NL query of the first subset of NL queries 310A may be semantically related to a second NL query of the second subset of NL queries 310B or the third subset of NL queries 310C. However, a strength of the semantic relationship may be significantly lower compared to strengths of semantic relationships between the first NL query and other NL queries of the first subset of NL queries 310A. Similarly, the circuitry 202 may determine that a first NL query of the second subset of NL queries 310B may be semantically related to a second NL query of the first subset of NL queries 310A or the third subset of NL queries 310C. Further, a first NL query of the third subset of NL queries 310C may be semantically related to a second NL query of the first subset of NL queries 310A or the second subset of NL queries 310B.

At 312, a weight may be assigned to each NL query of the set of NL queries 308A. In at least one embodiment, the circuitry 202 may be configured to assign a weight to each NL query of the set of NL queries 308A based on a level of difficulty associated with a corresponding NL query and the semantic relationship between the corresponding NL query and other NL queries of the set of NL queries 308A. The weight may be assigned in two stages, for example. At a first stage, a weight may be assigned based on the level of difficulty associated with the corresponding NL query. The level of difficulty may be set based on an association of personal information used for generation of the corresponding NL query with an aspect of personal life of the user 118. For example, a first NL query may be generated using personal information associated with the birth of the user 118, and a second NL query may be generated using personal information associated with the birth of a person in a relationship with the user 118.

The circuitry 202 may be configured to set the level of difficulty associated with the first NL query to a first value and the level of difficulty associated with the second NL query to a second value. The first value may be lower than the second value since a difficulty in determining the birth details of the person who is related to the user 118 may be higher compared to a difficulty in determining the birth details of the user 118. Further, a weight assigned to each of the first NL query and the second NL query (at the first stage) may correspond to the first value and the second value, respectively. Specifically, since the first value is lower than the second value, the weight assigned to the first NL query may be lower than the weight assigned to the second NL query.

At a second stage, a weight assigned to each NL query of the set of NL queries 308A in the first stage may be modified based on a semantic relationship between the corresponding NL query and other NL queries of the set of NL queries 308A. For example, each NL query of the first subset of NL queries 310A may be assigned a first weight in the first stage. Such an assignment may be due to association of all NL queries in the first subset of NL queries 310A with a same level of difficulty. Additionally, or alternatively, the assignment may be further due to the generation of all NL queries based on personal information associated with the same aspect of personal life (i.e., birth details) of the user 118. Similarly, all NL queries in the second subset of NL queries 310B may be assigned a second weight and all NL queries in the third subset of NL queries 310C may be assigned a third weight. The circuitry 202 may be configured to modify each of the first weight, the second weight, and the third weight.

In accordance with an embodiment, the first weight assigned to each NL query of the first subset of NL queries 310A may be modified such that a sum of weights assigned to the NL queries in the first subset of NL queries 310A is equal to or less than a threshold score at the second stage. The threshold score may be used for comparison with a weighted score for evaluation of a user response to an NL query. The weighted score may be determined based on the user response to the NL query (which may be rendered for type-1 authentication of the user 118). Similarly, the second weight assigned to each NL query of the second subset of NL queries 310B may be modified such that a sum of weights assigned to the NL queries in the second subset of NL queries 310B is equal to or less than the threshold score at the second stage. Similarly, the third weight assigned to each NL query of the third subset of NL queries 310C may be modified such that a sum of weights assigned to the NL queries in the third subset of NL queries 310C is equal to or less than the threshold score at the second stage. For example, the threshold score may be 0.9 or 1. The first weight assigned to each NL query of the first subset of NL queries 310A, at the first stage (i.e., based on the level of difficulty associated with each NL query) may be 0.4. Thus, a sum of weights assigned to the NL queries in the first subset of NL queries 310A may be equal to 1.2. At the second stage, the first weight assigned to the NL query "in which year you were born?" may be modified from 0.4 to 0.25. Similarly, the first weight assigned to the NL queries "in which month you were born?" and "on which date you were born?" may be modified from 0.4 to 0.3 and 0.35, respectively. After the modification, the sum of weights assigned to the NL queries in the first subset of NL queries 310A may be equal to 0.9. Thus, final weights assigned to the NL queries in the first subset of NL queries 310A may be 0.25, 0.3, and 0.35. The second weight assigned to each NL query of the second set of NL queries 310B and the third weight assigned to each NL query of the third set of NL queries 310C may be similarly modified. Further details related to the modification have been omitted from the disclosure for the sake of brevity.

In accordance with an embodiment, the first weight assigned to each NL query of the first subset of NL queries 310A may be modified such that a sum of weights assigned to the NL queries in the first subset of NL queries 310A is less than the threshold score at the second stage. Thus, the modification may result in a reduction of the first weight assigned to each NL query. The circuitry 202 may be configured to modify the first weight based on a set of detections. The set of detections may include a detection that a location of the user device 104, from where the request for accessing the user account is received, is different from a location registered with or usually associated with the electronic device 102. The set of detections may further include a detection that a duration for which the user account was accessed in a previous session is greater than a threshold duration. The set of detections may further include a detection that the user device 104 used for requesting access to the user account is not registered with the electronic device 102. The set of detections may further include a detection of an attempt to hack the user account for unauthorized use. Due to the modifications, an additional NL query may be required to be rendered such that an accumulation of a weight assigned to the additional NL query and the sum of weights assigned to the NL queries in the first subset of NL queries 310A is equal to the threshold score. Similarly, the second weight assigned to each NL query of the second subset of NL queries 310B may be modified such that a sum of weights assigned to the NL queries in the second subset of NL queries 310B is less than the threshold score at the second stage. Further, the third weight assigned to each NL query of the third subset of NL queries 310C may be modified such that a sum of weights assigned to the NL queries in the third subset of NL queries 310C is less than the threshold score at the second stage.

It should be noted that a weight assigned to an NL query of the set of NL queries 308A may be such that the assigned weight is less than the threshold score.

Figure 4:
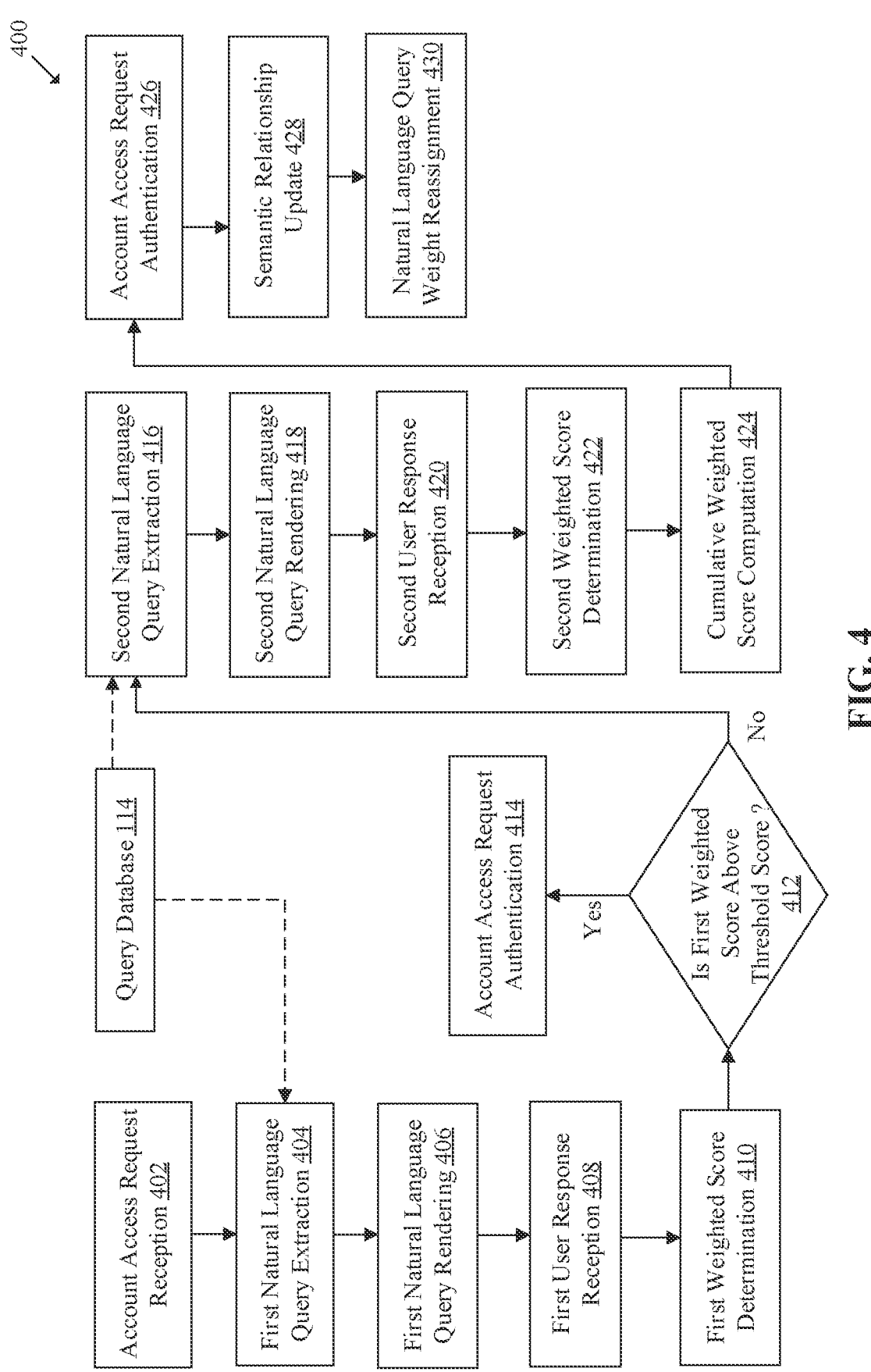
FIG. 4 is a diagram that illustrates an exemplary execution pipeline for an evaluation of user responses to AI-generated NL queries for type-1 authentication, in accordance with an embodiment of the disclosure.

FIG. 4 is a diagram that illustrates an exemplary execution pipeline for an evaluation of user responses to AI-generated NL queries for type-1 authentication, in accordance with an embodiment of the disclosure. FIG. 4 is explained in conjunction with elements from FIG. 1, FIG. 2, and FIG. 3. With reference to FIG. 4, there is shown an exemplary execution pipeline 400. The exemplary execution pipeline 400 may include a sequence of operations that may be executed by the circuitry 202 of the electronic device 102 of FIG. 1 for evaluation of user responses to at least one NL query of the set of NL queries 308A. The sequence of operations that may start at 402 and may terminate at 430.

At 402, a request to access a user account associated with a web-based application may be received. In at least one embodiment, the circuitry 202 may be configured to receive the request to access the user account associated with the web-based application. The request may be received via the web client 116 on the user device 104 based on a user input via a user interface element (for example, the user interface element 116A) rendered on a user interface of the web-based application (loaded on the web client 116).

At 404, a first NL query may be extracted based on the (received) request. In at least one embodiment, the circuitry 202 may be configured to extract (from the query database 114) the first NL query of the set of NL queries 308A based on the request. For example, the extracted first NL query may be "on which date did you join XYZ?". The circuitry 202 may extract the first NL query to verify the request and ascertain the identity of the user 118 who raised the request. Thus, the circuitry 202 may transmit the first NL query to the user device 104.

At 406, the user device 104 may be controlled to render the first NL query. In at least one embodiment, the circuitry 202 may be configured to control the user device 104 associated with the user 118 to render the first NL query. The web client 116 may be controlled to render the first NL query on the user interface of the web-based application.

At 408, a first user response to the first NL query may be received. In at least one embodiment, the circuitry 202 may be configured to receive the first user response to the first NL query from the user device 104. For example, the received first user response may be "21/04/2000" and may be received via a user interface element (for example, the user interface element 116B) rendered on the user interface of the web-based application (on the web client 116). The web client 116 on the user device 104 may transmit the first user response to the electronic device 102.

At 410, a first weighted score may be determined based on an application of the first ML model 110 on the first user response. In at least one embodiment, the circuitry 202 may be configured to determine the first weighted score for the first user response based on the application of the first ML model 110 on the first user response. The circuitry 202 may evaluate the first user response based on the first weighted score. The first weighted score may indicate the level of difficulty associated with the first NL query and an accuracy of the first user response with respect to a NL response (i.e., an actual NL response) for the first NL query stored in the query database 114. The actual NL response to the first NL query may be retrieved from the query database 114. For example, the retrieved NL response may be "21/04/2000". In some embodiments, all NL responses in the query database 114 may be stored in a vectorized format. The circuitry 202 may vectorize the first user response and apply the first ML model 110 on the vectorized first user response (i.e., an input). The first ML model 110 may generate an output, indicative of the accuracy of the first user response, based on the vectorized first user response and a vectorized actual NL response to the first NL query.

In accordance with an embodiment, the value of the first weighted score may be determined based on a weight assigned (after the second stage) to the first NL query and the output of the first ML model 110 determined based on the application of the first ML model 110 on the first user response. The weight assigned to the first NL query may indicate the level of difficulty of the first NL query (since the weight assigned to the first NL query may be determined based on the level of difficulty associated with the first NL query). The output of the first ML model 110 may indicate the accuracy of the first user response. The first ML model 110 may generate an output based on whether the first ML model 110 is trained to determine a hard accuracy or a soft accuracy of a user response. If the first ML model 110 is trained to determine the hard accuracy, the output may be "0" (if the user response is determined to be inaccurate with respect to the actual NL response) or "1" (if the user response is determined to be accurate with respect to the actual NL response). Whereas, if the first ML model 110 is trained to determine the soft accuracy, the output may be a real number between "0" and "1". The output may be "0" if the user response is wrong (or incorrect), "1" if the user response is correct, or "between "0" and "1" if the user response is partially correct.

For example, the circuitry 202 may determine a match between the first user response (received at 408) and the actual NL response (retrieved at 410) for the first NL query stored in the query database 114. In this scenario, the output of the first ML model 110 may be "1" (based on the match), regardless of whether the first ML model 110 is trained to determine the hard accuracy or the soft accuracy of the first user response. Thus, the second user response may be determined as accurate. The first weighted score may be determined based on the weight assigned to the first NL query since the output of the first ML model 110 is "1". However, if the first user response is "20/04/2000" and the first ML model 110 is trained to determine a hard accuracy, then the output of the first ML model 110 may be "0" (and the first weighted score may be determined as '0'). The output of the first ML model 110 may be a value that lies between "0" and "1" (for example, 0.8) if the first ML model 110 is trained to determine a soft accuracy. The first weighted score may be determined based on the weight assigned to the first NL query and a value of the output of the first ML model 110.

At 412, it may be determined whether the first weighted score is above a threshold score. In at least one embodiment, the circuitry 202 may be configured to determine whether the first weighted score is above the threshold score. The first weighted score may be above the threshold score if the weight assigned to the first NL query is sufficiently high (i.e., if the level of difficulty associated with the first NL query is high), and the first user response is determined to be accurate with respect to the actual NL response (which may be determined based on the application of the first ML model 110 on the first user response or the output of the first ML model 110). Whereas the first weighted score may be below the threshold score if the level of difficulty associated with the first NL query or the weight assigned to the first NL query is low (not sufficiently high), irrespective of whether the first user response is determined to be accurate, inaccurate, or partially accurate with respect to the actual NL response.

At 414, the request to access the user account may be authenticated if the first weighted score is above the threshold score. In at least one embodiment, the circuitry 202 may be configured to authenticate the request to access the user account associated with the web-based application based on a determination that the first weighted score is above the threshold score. The determination may indicate that the weight assigned to the first NL query is above (or equal to) the threshold score (if the output of the first ML model 110 is "1"). The circuitry 202 may issue an authentication token to the web client 116 based on the authentication of the request. In accordance with an embodiment, the authentication may be a type-1 authentication. On reception of the authentication token, the web client 116 may render (on the user interface of the web-based application) the user interface element 116D (for example, the radio button "log-in"). In some embodiments, the received authentication token may be used to initiate a process for a type-2 authentication of the request.

At 416, a second NL query may be extracted if the first weighted score is below (i.e., not above) the threshold score. In at least one embodiment, the circuitry 202 may be configured to extract (from the query database 114) the second NL query of the set of NL queries 308A based on a determination that the first weighted score is below the threshold score. The circuitry 202 may determine a requirement to extract the second NL query from the query database 114 based on the determined first weighted score (which is below the threshold score). Thereafter, the circuitry 202 may be configured to extract the second NL query based on the requirement so as to determine a second weighted score. The determination of the second weighted score may be performed based on a second user response (to be received) to the second NL query. Thereafter, the second weighted score may be accumulated with the determined first weighted score for determination of a cumulative weighted score. The cumulative weighted score may be required to be equal to or above the threshold score for the authentication of the request. At this stage, the cumulative weighted score may be the first weighted score. The requirement for the extraction of the second NL query may be determined if the first weighted score (i.e., the cumulative weighted score at this stage) is below the threshold score. In an example embodiment, the second NL query of the set of NL queries 308A (extracted from the query database 114) may be "who joined XYZ with you?". The circuitry 202 may be configured to transmit the extracted second NL query to the user device 104.

At 418, the user device 104 may be controlled to render the second NL query. In at least one embodiment, the circuitry 202 may be configured to control the user device 104 to render the second NL query. Specifically, the web client 116 may be controlled to render the second NL query on the user interface of the web-based application.

At 420, a second user response to the second NL query may be received. In at least one embodiment, the circuitry 202 may be configured to receive the second user response to the second NL query from the user device 104. The second user response may be "ABC", for example. The web client 116 on the user device 104 may transmit the second user response to the electronic device 102.

At 422, a second weighted score may be determined based on an application of the first ML model 110 on the second user response. In at least one embodiment, the circuitry 202 may be configured to determine the second weighted score for the second user response based on the application of the first ML model 110 on the second user response. The second weighted score may indicate a level of difficulty associated with the second NL query and an accuracy of the second user response with respect to a NL response (i.e., an actual NL response) for the second NL query stored in the query database 114. The circuitry 202 may retrieve the actual NL response to the second NL query from the query database 114. The retrieved NL response may be "ABC".

In accordance with an embodiment, the value of the second weighted score may be determined based on a weight assigned (after the second stage) to the second NL query and an output of the first ML model 110 that may be determined based on the application of the first ML model 110 on the second user response. The weight assigned to the second NL query may indicate the level of difficulty of the second NL query. The output of the second ML model 112 may indicate the accuracy of the second user response. For example, the circuitry 202 may determine a match between the second user response (received at 420) and the actual NL response for the second NL query (retrieved from the query database 114). In this scenario, the second user response may be determined to be accurate based on the determined match, and the output of the second ML model 112 may be "1". Therefore, the circuitry 202 may determine the second weighted score based on the weight assigned to the second NL query.

At 424, a sum of the first weighted score and the second weighted score may be computed. In at least one embodiment, the circuitry 202 may be configured to compute the sum of the first weighted score and the second weighted score. The computed sum of first weighted score and the second weighted score may be considered as a cumulative weighted score. The circuitry 202 may be further configured to determine that the sum of the first weighted score and the second weighted score is above the threshold score. If the cumulative weighted score (i.e., the sum of the first weighted score and the second weighted score) is still not equal to or above the threshold score, the circuitry 202 may be further configured to extract a third NL query. Thereafter, a third weighted score may be determined for a third user response to the third NL query. The third weighted score may be accumulated with the cumulative weighted score to obtain an updated cumulative weighted score (i.e., the sum of the first weighted score, the second weighted score, and the third weighted score). Thus, the circuitry 202 may continue to determine a requirement to extract an NL query of the set of NL queries 308A, determine a weighted score for a user response to the extracted NL query, and accumulate the determined weighted score with a previously determined cumulative weighted score until an updated cumulative weighted score is equal to or above the threshold score. In at least one embodiment, a limit may be defined to set a maximum number of NL queries that may be presented to the user 118 for the type-1 authentication. If the cumulative weighted score is below the threshold score after touching the limit, then the request may be denied or rejected.

At 426, the request to access the user account may be authenticated based on the determination that the computed sum is above the threshold score. In at least one embodiment, the circuitry 202 may be configured to authenticate the request based on the determination that the computed sum is above the threshold score. The circuitry 202 may be further configured to issue an authentication token to the web client 116 based on the authentication of the request. The web client 116 may indicate, via the user interface of the web-based application, that the request to access the user account is authenticated and the user 118 can proceed to access the user account. In some embodiments, the circuitry 202 may be configured to initiate a process for a type-2 authentication of the request using the issued authentication token.

At 428, a semantic relationship between the first NL query and the second NL query may be updated based on the authentication of the request. In at least one embodiment, the circuitry 202 may be configured to update the semantic relationship between the first NL query and the second NL query based on the authentication of the request. The update may be required since the semantic relationship or the strength of the semantic relationship (determined at 310) between the first NL query (of the third subset of NL queries 310C) and the second NL query (of the second subset of NL queries 310B) may be undefined. The update of the semantic relationship may include a formation of a semantic relationship between the first NL query and the second NL query. In some scenarios, a strength of an (established) semantic relationship between the first NL query and the second NL query may be updated (increased) based on the authentication. The circuitry 202 may establish the semantic relationship or increase the strength of the semantic relationship since both the first NL query and the second NL query are associated with an event in which both the user 118 and the user "ABC" joined an "XYZ" organization.

At 430, weights assigned to NL queries of the set of NL queries 308A that may be semantically related to the first NL query and the second NL query may be updated (reassigned) based on the updated semantic relationship between the first NL query and the second NL query. In at least one embodiment, the circuitry 202 may be configured to reassign the weights associated with the NL queries based on the updated semantic relationship between the first NL query and the second NL query. For example, a weight assigned to each NL query in the second subset of NL queries 310B may be updated (i.e., reassigned) such that a sum of weights assigned to the NL queries is equal to or less than the threshold score. Similarly, a weight assigned to each NL query of the third subset of NL queries 310C may be updated such that a sum of weights assigned to the NL queries is equal to or less than the threshold score.

FIG. 5 is a diagram that illustrates an exemplary scenario for creation of a graph database based on semantic relationships between pairs of AI-generated NL queries, in accordance with an embodiment of the disclosure. FIG. 5 is explained in conjunction with elements from FIG. 1, FIG. 2, FIG. 3, and FIG. 4. With reference to FIG. 5, there is shown an exemplary scenario 500. In the exemplary scenario 500, there is shown a set of NL queries 502 and a query database 504. The query database 504 may be an exemplary implementation of the query database 114 of FIG. 1. The query database 504 may be created based on the set of NL queries 502 and semantic relationships between pairs of NL queries of the set of NL queries 502.

The set of NL queries 502 may be generated based on an application of the second ML model 112 on a set of paragraphs. The set of paragraphs may be generated based on a set of key-value pairs extracted based on personal information associated with multiple aspects of the personal life of the user 118. For example, the set of NL queries 502 may include eight NL queries, viz., Q1-Q8, that may be generated from three paragraphs. The eight NL queries may be included in three subsets of NL queries, and NL queries in each subset may be generated based on an application of the second ML model 112 on one of the three paragraphs. As shown in FIG. 5, NL queries Q1, Q2, and Q3 of a first subset may be generated from a first paragraph that includes birth details, NL queries Q4 and Q5 of a second subset may be generated from a second paragraph that includes marriage details, and NL queries Q6, Q7, and Q8 of a third subset may be generated from a third paragraph that includes spouse details.

In at least one embodiment, the query database 504 may be a graph database. The graph database may include the set of NL queries 502 and a set of NL responses corresponding to the set of NL queries 502. The nodes of the graph database (i.e., the query database 504) may be representative of the set of NL queries 502. The graph database may include eight nodes since the set of NL queries 502 includes eight NL queries. Based on a semantic analysis of each NL query of the set of NL queries 502 (e.g., Q1-Q8) and each paragraph of the set of paragraphs (e.g., three paragraphs), the circuitry 202 may determine semantic relationships between each pair of NL queries of the set of NL queries 502. An edge between each pair of nodes in the graph database (i.e., the query database 504) may indicate a presence of a semantic relationship between a corresponding pair of NL queries.

In certain embodiments, the circuitry 202 may determine that each pair of NL queries within each subset (i.e., the first subset, the second subset, or the third subset) is semantically related to each other. For example, Q1, Q2, and Q3 (of the first subset), may be determined to be semantically related to each other. The semantic relationships may be represented using edges between the nodes representative of Q1 and Q2, Q1 and Q3, and Q2 and Q3. Similarly, Q4 and Q5 may be determined to be semantically related to each other and the semantic relationship may be represented using an edge between the nodes representative of Q4 and Q5. Further, Q6, Q7, and Q8 may be semantically related to each other. The semantic relationships may be represented using edges between the nodes representative of Q6 and Q7, Q7 and Q8, and Q6 and Q8. A distance between each pair of nodes (which is representative of a pair of NL queries of the set of NL queries 502) in the graph database (i.e., the query database 504) may be indicative of a strength the semantic relationship. For example, the distance between each pair of nodes such as Q1 and Q2, Q1 and Q3, Q2 and Q3, Q4 and Q5, Q6 and Q7, Q7 and Q8, or Q6 and Q8 may be indicative of the strength the semantic relationship between the corresponding pair of nodes.

The circuitry 202 may further determine that NL queries of different subsets may be semantically related to each other. For example, Q1 of the first subset may be determined to be semantically related to Q5 of the second subset, and Q4 of the second subset may be determined to be semantically related to Q7 of the third subset. Such relationships may be represented using an edge between the nodes for Q1 and Q5 and an edge between the nodes for Q4 and Q7. The circuitry 202 may further determine that strengths of semantic relationships between pairs of NL queries of different subsets may be lower compared to strengths of semantic relationships between pairs of NL queries of a same subset. For example, a strength of the semantic relationship between Q1 and Q5 may be lower compared to strengths of semantic relationships between Q1 and Q2, Q1 and Q3, or Q5 and Q4. Similarly, a strength of the semantic relationship between Q4 and Q7 may be lower compared to strengths of semantic relationships between Q4 and Q5, Q7 and Q6, or Q7 and Q8. Thus, the distance between a pair of nodes, i.e., between Q1 and Q2, Q1 and Q3, Q2 and Q3, Q4 and Q5, Q6 and Q7, Q7 and Q8, or Q6 and Q8, may be lesser compared to a distance between pair of nodes such as Q1 and Q5 or Q4 and Q7.

In accordance with an embodiment, the circuitry 202 may assign weights to each NL query of the set of NL queries 502 in two stages. In the first stage, a weight may be assigned to each NL query based on a level of difficulty associated with a corresponding NL query. NL queries of a subset (such as the first subset, second subset, or third subset), may be associated with a same or similar level of difficulty since the NL queries may be generated from the same paragraph that includes personal information associated with a particular aspect (such as birth, marriage, or spouse) of the personal life. Consequently, the weights assigned to the NL queries of the subset at the first stage may be same or similar. For example, each of Q1, Q2, and Q3 of the first subset may be assigned a first weight, each of Q4 and Q5 of the second subset may be assigned a second weight, and each of Q6, Q7, and Q8 of the third subset may be assigned a third weight. In the second stage, the first weight assigned to at least one of Q1, Q2, or Q3, may be modified such that a cumulative weight for Q1, Q2, and Q3 is less than or equal to the threshold score. The second weight assigned to at least one of Q4 or Q5 may be modified such that a cumulative weight for Q4 and Q5 is less than or equal to the threshold score. Further, the third weight assigned to at least one of Q6, Q7, or Q8 may be modified such that a cumulative weight for Q6, Q7, and Q8 is less than or equal to the threshold score.

In operation, the circuitry 202 may extract a first NL query (for example, Q4) of the set of NL queries 502 based on reception of a request to access a user account of a web-based application and control the user device 104 to render the extracted first NL query. The circuitry 202 may further receive a first user response to the first NL query and may determine a first weighted score. The determination may be based on a weight associated with the first NL query and an accuracy of the first user response with respect to an actual NL response for the first NL query. If the first user response is accurate, the first weighted score may be determined based on the weight assigned to the first NL query. Based on the first weighted score, a second NL query may be extracted. The circuitry 202 may determine a requirement to extract the second NL query if the weight assigned to the first NL query (i.e., Q4) is less than the threshold score.

In accordance with an embodiment, the circuitry 202 may be configured to extract the second NL query based on a semantic relationship between the first NL query and the second NL query. The second NL query may be Q5 since Q5 is semantically related to Q4 and the strength of the semantic relationship between Q4 and Q5 is higher compared to the strength of the semantic relationship between Q4 and Q1 or Q4 and Q7. The user device 104 may be controlled to render extracted second NL query and a second user response to the second NL query may be received. The circuitry 202 may determine a second weighted score based on the second user response. If the second user response is accurate, the second weighted score may be determined based on a weight assigned to the second NL query. The request may be authenticated if the cumulative weight for Q4 and Q5 is equal to or above the threshold score. If the cumulative weight for Q4 and Q5 is less than the threshold score, then the circuitry 202 may determine a requirement to extract a third NL query that may be semantically related or unrelated to the second NL query (i.e., Q5). The third query may be any NL query of the set of NL queries 502 (apart from Q4 and Q5).

In accordance with an embodiment, the circuitry 202 may be configured to extract the second NL query based on the first user response. For example, if Q8 is the extracted first NL query, the extracted second NL query that may be semantically related to Q8 may be Q6. This may be because the first user response (to Q8) is "L" and the second user response (to Q6) that may be expected from the user device 104 is "Lisa" (which includes the first user response).

Figure 6:
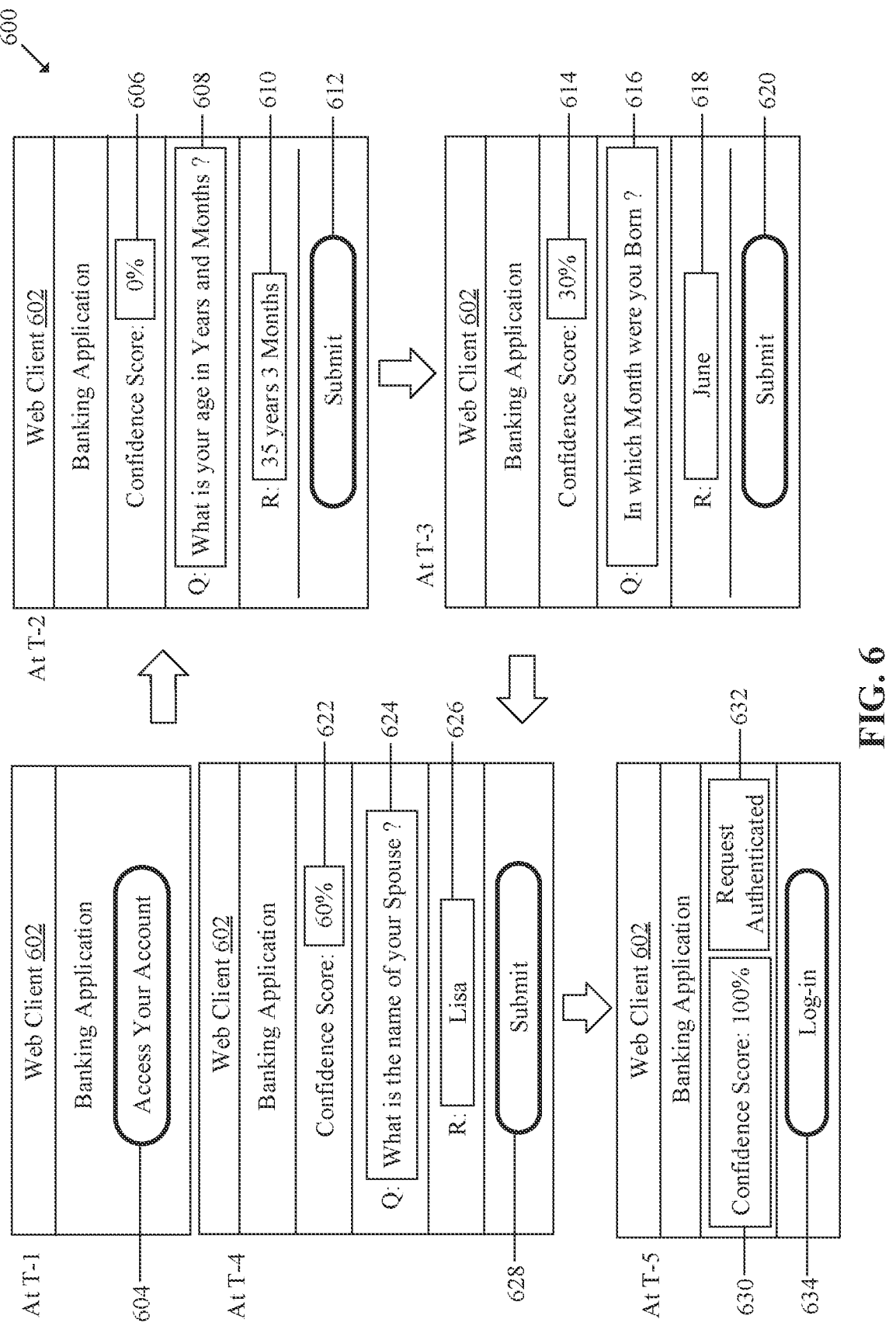
FIG. 6 is a diagram that illustrates an exemplary scenario for a rendering of AI-generated NL queries and a reception of user responses for type-1 authentication, in accordance with an embodiment of the disclosure.

FIG. 6 is a diagram that illustrates an exemplary scenario for a rendering of AI-generated NL queries and a reception of user responses for type-1 authentication, in accordance with an embodiment of the disclosure. FIG. 6 is explained in conjunction with elements from FIG. 1, FIG. 2, FIG. 3, FIG. 4, and FIG. 5. With reference to FIG. 6, there is shown an exemplary scenario 600. In the exemplary scenario 600, there is shown a web client 602. The web client 602 may be controlled to render a user interface of a web-based application. The web-based application may be a banking application, for example. The circuitry 202 may control the web client 602 to render NL queries and user interface elements for reception of user responses to the NL queries. The web client 602 may be rendered on the user device 104 or a display device 210 of the user device 104.

At time instant T-1, the circuitry 202 may control the web client 602 to render a user interface element 604 (for example, a radio button "access your account") for reception of a request (from the user 118) to access a user account of the web-based application (i.e., the banking application). Based on a reception of the request via the user interface element 604, the circuitry 202 may be configured to control the web client 602 to render, at time instance T-2, user interface elements 606, 608, 610, and 612. The user interface element 606 may indicate a confidence score. Initially (at T-2), the confidence score may be 0%. The confidence score may indicate a confidence of the electronic device 102 (or a server that may be associated with the web-based application) that the request is authentic or that the request is received from an authentic or genuine user. The confidence score may be 0% since the electronic device 102 has not received any accurate user response to any NL query (until T-2) so far. The user interface element 608 may render a first NL query "what is your age in years and months?". The first NL query may be rendered for reception of a user response which may be evaluated for authenticating the request. The user interface element 610 may be a textbox that may allow the user 118 to enter a first user response to the first NL query. For example, the first user response may be "35 years, 3 months". The user interface element 612 may be a radio button (for example, "submit") that may allow the user 118 to submit the first user response. Once the first user response is submitted, the web client 602 may transmit the first user response to the electronic device 102.

Upon reception of the first user response, the circuitry 202 may evaluate the first user response based on an application of the first ML model 110 on the received first user response. Based on the application, the first ML model 110 may generate an output that may be indicative of an accuracy of the first user response. Thereafter, the circuitry 202 may determine a first weighted score based on a weight assigned to the first NL query and the accuracy of the first user response. Based on the first weighted score, the score of confidence may be updated to 30% (from 0%). The confidence score may indicate that the first weighted score is less than the threshold score. Based on the confidence score, the circuitry 202 may control the web client 602 to render, at time instance T-3, user interface elements 614, 616, 618, and 620. The user interface element 614 may indicate the confidence score (at T-3) is 30%. Thereafter, the user interface 616 may render a second NL query "in which month you were born?". The second NL query may be semantically related to the first NL query. The user interface element 618 may be a textbox that may allow the user 118 to enter a second user response to the second NL query. For example, the second user response may be "June". The user interface element 620 may be a radio button (for example, "submit") that may allow the user 118 to submit the second user response. Once the second user response is submitted, the web client 602 may transmit the second user response to the electronic device 102.

Upon reception of the second user response, the circuitry 202 may evaluate the second user response based on an application of the first ML model 110 on the second user response. The first ML model 110 may generate an output that may indicate an accuracy of the second user response. Thereafter, a second weighted score may be determined based on a weight assigned to the second NL query and the accuracy of the second user response. Based on an accumulation of the first weighted score and the second weighted score, the score of confidence may be updated to 60% (from 30%). The confidence score may indicate that a result of the accumulation (or a cumulative weight of the first NL query and the second NL query) is less than the threshold score. Based on the confidence score, the circuitry 202 may control the web client 602 to render, at time instance T-4, user interface elements 622, 624, 626, and 628. The user interface element 622 may indicate the confidence score (at T-4) is 60%. The user interface 624 may render a third NL query "what is the name of your spouse?". The third NL query may not be semantically related to the first NL query and the second NL query. In some embodiments, a weight assigned to the third NL query may be updated based on the second user response. The updated weight may be such that an accumulation of the first weighted score, the second weighted score, and a third weighted score (to be determined based on the updated weight assigned to the third NL query) is above the threshold score (provided an evaluation of a third user response (to be determined) is accurate). The user interface element 626 may be a textbox that may allow the user 118 to enter a third user response to the third NL query. For example, the entered third user response may be "Lisa". The user interface element 628 may be a radio button (for example, "submit") that may allow the user 118 to submit the third user response. The web client 602 may transmit the third user response to the electronic device 102 once the third user response is submitted.

The circuitry 202 may evaluate the third user response based on an application of the first ML model 110 on the third user response. The first ML model 110 may generate an output that may indicate an accuracy of the third user response. Thereafter, a third weighted score may be determined based on the weight (i.e., the updated weight) that may be assigned to the third NL query and the accuracy of the third user response. Based on an accumulation of the first weighted score, the second weighted score, and the third weighted score, the score of confidence may be updated to 100% (from 60%). The confidence score may indicate that a result of the accumulation is above (or equal to) the threshold score. Based on the confidence score, the circuitry 202 may authenticate the request (via the user interface element 604) and issue an authentication token to the web client 602 (to indicate the web client 602 that the request is authenticated). The circuitry 202 may further control the web client 602 to render, at time instance T-5, user interface elements 630, 632, and 634. The user interface element 630 may indicate the confidence score (at T-5) is 100%, the user interface element 632 may indicate a message "request authenticated", and the interface element 634 may be a radio button (for example, "log-in") that allows the user 118 to log-in to the user account of the web-based application.

FIG. 7 is a flowchart that illustrates operations for an exemplary method for type-1 authentication based on AI-generated queries, in accordance with an embodiment of the disclosure. FIG. 7 is explained in conjunction with elements from FIG. 1, FIG. 2, FIG. 3, FIG. 4, FIG. 5, and FIG. 6. With reference to FIG. 7, there is shown a flowchart 700. The operations from 702 to 716 may be implemented by any computing system, such as, by the electronic device 102, or the circuitry 202 of the electronic device 102, of FIG. 1. The operations may start at 702 and may proceed to 704.

At 704, a request, to access a user account associated with a web-based application, may be received via a web client 116 on a user device 104. In at least one embodiment, the circuitry 202 may be configured to receive, via the web client 116 on the user device 104, the request to access the user account associated with the web-based application. The details of reception of the request to access the user account associated with the web-based application, is described, for example, in FIG. 1 and FIG. 4.

At 706, a first NL query may be extracted from the query database 114 based on the request. In at least one embodiment, the circuitry 202 may be configured to extract the first NL query from the query database 114 based on the request. The query database 114 may include a set of NL queries that may be based on information associated with a personal life of the user 118. The details of extraction of the first NL query from the query database 114, is described, for example, in FIG. 1, FIG. 4, FIG. 5, and FIG. 6.

At 708, the user device 104 associated with the user 118 may be controlled to render the first NL query. In at least one embodiment, the circuitry 202 may be configured to control the user device 104 associated with the user 118 to render the first NL query. The details of rendering of the first NL query on the user device 104, is described, for example, in FIG. 1, FIG. 4, and FIG. 6.

At 710, a first user response to the first NL query may be received from the user device 104. In at least one embodiment, the circuitry 202 may be configured to receive the first user response to the first NL query from the user device 104. The details of reception of the first user response to the first NL query, are described, for example, in FIG. 1, FIG. 4, FIG. 5, and FIG. 6.

At 712, a first weighted score for the first user response may be determined based on an application of the first ML model 110 on the first user response. In at least one embodiment, the circuitry 202 may be configured to determine the first weighted score for the first user response based on the application of the first ML model 110 on the first user response. The first weighted score may indicate a level of difficulty associated with the first NL query and an accuracy of the first user response with respect to a NL response for the first NL query in the query database 114. The details of determination of the first weighted score for the first user response, are described, for example, FIG. 1, FIG. 4, FIG. 5, and FIG. 6.

At 714, the first weighted score may be determined to be above the threshold score. In at least one embodiment, the circuitry 202 may be configured to determine that the first weighted score is above the threshold score. In some embodiments, the threshold score may be a dynamic value that may be computed based on a user-specific setting or a number of failed attempts (i.e., incorrect NL responses to NL queries). The user-specific setting may indicate a value of the threshold score for the user 118. The threshold score may be updated if a count of NL queries presented to the user 118, for the type-1 authentication, exceeds a limit set for the user 118. The details of determination that the first weighted score is above the threshold score, are described, for example, in FIG. 1, and FIG. 4.

At 716, the request may be authenticated based on the determination that the first weighted score is above the threshold score. In at least one embodiment, the circuitry 202 may be configured to authenticate the request based on the determination that the first weighted score is above the threshold score. The details of authentication of the request based on the first weighted score, are described, for example, in FIG. 1, FIG. 4, and FIG. 6. Control may pass to the end.

Although the flowchart 700 is illustrated as discrete operations, such as 704, 706, 708, 710, 712, 714, and 816, the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic device (such as the electronic device 102). The computer-executable instructions may cause the machine and/or computer to perform operations that include reception, via the web client 116 on the user device 104, a request to access a user account associated with a web-based application. The operations may further include extraction of a first NL query from the query database 114 based on the request. The query database 114 may include a set of NL queries that is based on information associated with a personal life of the user 118. The operations may further include controlling of the user device 104 associated with the user 118 to render the first NL query. The operations may further include reception of a first user response to the first NL query from the user device 104. The operations may further include determination of a first weighted score for the first user response based on an application of the first ML model 110 on the first user response. The first weighted score may indicate a level of difficulty associated with the first NL query and an accuracy of the first user response with respect to a NL response for the first NL query in the query database 114. The operations may further include determination that the first weighted score is above a threshold score. The operations may further include authentication of the request based on the determination that the first weighted score is above the threshold score.

Exemplary aspects of the disclosure may include a method that may be implemented on an electronic device (such as, the electronic device 102 of FIG. 1) that may include circuitry (such as the circuitry 202). The method comprises receiving, via the web client 116 on the user device 104, a request to access a user account associated with a web-based application. The method further comprises extracting a first NL query from the query database 114 based on the request. The query database 114 may include a set of NL queries that may be based on information associated with a personal life of the user 118. The query database may be a graph database that may include the set of NL queries and a set of NL responses corresponding to the set of NL queries. Nodes of the graph database may be representative of the set of NL queries. An edge between each pair of nodes in the graph database may be indicative of a presence of a semantic relationship between a corresponding pair of NL queries. A distance between each pair of nodes in the graph database may be indicative of a strength the semantic relationship. The method further comprises controlling the user device 104 associated with the user 118 to render the first NL query. The method further comprises receiving a first user response to the first NL query from the user device 104. The method further comprises determining a first weighted score for the first user response based on an application of the first ML model 110 on the first user response. The first weighted score may indicate a level of difficulty associated with the first NL query and an accuracy of the first user response with respect to a NL response for the first NL query in the query database 114. The method further comprises determining that the first weighted score is above a threshold score. The method further comprises authenticating the request based on the determination that the first weighted score is above the threshold score.

In accordance with an embodiment, the method further comprises receiving information associated with the personal life of the user 118 from an information source. The method further comprises extracting a set of key-value pairs from the received information. The method further comprises generating a set of paragraphs from the set of key-value pairs. Each paragraph of the set of paragraphs may be associated with a key-value pair of the set of key-value pairs and may correspond to an aspect of the personal life. The method further comprises generating the set of NL queries based on an application of the second ML model 112 on the set of paragraphs. A subset of NL queries of the set of NL queries is generated for each paragraph of the set of paragraphs.

In accordance with an embodiment, the method further comprises determining a semantic relationship between each pair of NL queries of the set of NL queries based on at least one paragraph of the set of paragraphs. The method further comprises assigning a weight to each NL query of the set of NL queries based on a level of difficulty associated with a corresponding NL query and the semantic relationship. The query database may include the weight and the semantic relationship for each NL query with other NL queries of the set of NL queries.

In accordance with an embodiment, the method further comprises updating weight parameters of the first ML model 110 based on the authentication of the request and the first weighted score.

In accordance with an embodiment, the method further comprises updating the semantic relationship of at least one NL query with other NL queries of the set of NL queries in the query database 114 based on the authentication of the request. The method further comprises updating the weight assigned to the at least one NL query of the set of NL queries based on the updated semantic relationship.

In accordance with an embodiment, the method further comprises determining a requirement to extract a second NL query from the query database 114 based on a determination that the first weighted score is below the threshold score. The method further comprises extracting the second NL query from the query database 114 based on a determination that the first weighted score is below the threshold score. The second NL query may be extracted further based on at least one of the first user response or a semantic relationship between the first NL query and the second NL query.

In accordance with an embodiment, the method further comprises controlling the user device 104 to further render the second NL query. The method further comprises receiving a second user response to the second NL query from the user device 104. The method further comprises determining a second weighted score for the second user response based on application of the first ML model 110 on the second user response. The method further comprises computing a sum of the first weighted score and the second weighted score. The method further comprises authenticating the request further based on a determination that the sum is above the threshold score.

In accordance with an embodiment, the method further comprises issuing an authentication token to the web client 116 based on the authentication of the request. The authentication may be a type-1 authentication. The authentication token may be used to initiate a process for a type-2 authentication of the request.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. A method, comprising:
   receiving, via a web client on a user device, a request to access a user account associated with a web-based application;
   extracting a first natural language (NL) query from a query database based on the received request, wherein
      the query database includes a set of NL queries that is based on information associated with a personal life of a user, and
      the set of NL queries includes the extracted first NL query;
   controlling the user device associated with the user to render the extracted first NL query;
   receiving a first user response to the rendered first NL query from the user device;
   determining, based on an application of a first machine learning (ML) model on the received first user response, a first weighted score for the received first user response, wherein
      the determined first weighted score indicates:
         a level of difficulty associated with the rendered first NL query, and
         an accuracy of the received first user response with respect to a NL response for the rendered first NL query, and
      the query database includes the NL response;
   and
   authenticating the received request based on the determined first weighted score that is above a threshold score.

2. The method according to claim 1, wherein
   the query database is a graph database that includes the set of NL queries and a set of NL responses corresponding to the set of NL queries, and
   the set of NL responses includes the NL response.

3. The method according to claim 2, wherein
   nodes of the graph database represent the set of NL queries,
   an edge between each pair of the nodes in the graph database is indicative of a presence of a semantic relationship between a corresponding pair of NL queries from the set of NL queries, and a distance between the each pair of the nodes in the graph database is indicative of a strength the semantic relationship.

4. The method according to claim 1, further comprising updating weight parameters of the first ML model based on the authentication of the received request and the determined first weighted score.

5. The method according to claim 1, further comprising:

receiving the information associated with the personal life of the user from an information source;

extracting a set of key-value pairs from the received information;

generating a set of paragraphs from the extracted set of key-value pairs, wherein each paragraph of the generated set of paragraphs is associated with a key-value pair of the extracted set of key-value pairs, and the each paragraph of the generated set of paragraphs corresponds to an aspect of the personal life;

generating the set of NL queries based on an application of a second ML model on the generated set of paragraphs; and generate a subset of NL queries of the generated set of NL queries for the each paragraph of the generated set of paragraphs.

6. The method according to claim 5, further comprising:

determining, based on at least one paragraph of the generated set of paragraphs, a semantic relationship between each pair of NL queries of the set of NL queries; and assigning a weight to each NL query of the set of NL queries based on a level of difficulty associated with a corresponding NL query of the set of NL queries and the determined semantic relationship, wherein the query database includes the assigned weight and the determined semantic relationship for the each NL query of the set of NL queries.

7. The method according to claim 6, further comprising:

determining, based on the determined first weighted score that is below the threshold score, a requirement to extract a second NL query from the query database, wherein the set of NL queries includes the second NL query; and extracting the second NL query from the query database based on the determined requirement.

8. The method according to claim 7, further comprising extracting the second NL query further based on at least one of the received first user response or the determined semantic relationship between the rendered first NL query and the second NL query.

9. The method according to claim 7, further comprising:

controlling the user device to further render the extracted second NL query;

receiving a second user response to the rendered second NL query from the user device;

determining, based on the application of the first ML model on the received second user response, a second weighted score for the received second user response;

computing a sum of the determined first weighted score and the determined second weighted score; and authenticating the received request further based on the computed sum that is above the threshold score.

10. The method according to claim 9, further comprising:

updating, based on the authentication of the received request, the determined semantic relationship of at least one pair of NL queries of the set of NL queries in the query database; and updating, based on the updated semantic relationship, the assigned weight of the at least one pair of NL queries of the set of NL queries.

11. The method according to claim 1, further comprising issuing an authentication token to the web client based on the authentication of the received request.

12. The method according to claim 11, wherein the authentication is a type-1 authentication, and the authentication token is used to initiate a process for a type-2 authentication of the received request.

13. An electronic device, comprising:

a memory configured to store a first machine learning (ML) model and a second ML model; and circuitry configured to:

receive, via a web client on a user device, a request to access a user account associated with a web-based application;

extract a first natural language (NL) query from a query database based on the received request, wherein the query database includes a set of NL queries that is based on information associated with a personal life of a user, and the set of NL queries includes the extracted first NL query;

control the user device associated with the user to render the extracted first NL query;

receive a first user response to the rendered first NL query from the user device;

determine, based on an application of the stored first ML model on the received first user response, a first weighted score for the received first user response, wherein the determined first weighted score indicates:

a level of difficulty associated with the rendered first NL query; and an accuracy of the received first user response with respect to a NL response for the first NL query, and the query database includes the NL response; and authenticate the received request based on the determined first weighted score that is above a threshold score.

14. The electronic device according to claim 13, wherein the circuitry is further configured to:

receive the information associated with the personal life of the user from an information source;

extract a set of key-value pairs from the received information;

generate a set of paragraphs from the set of key-value pairs, wherein each paragraph of the generated set of paragraphs is associated with a key-value pair of the set of key-value pairs, and the each paragraph of the generated set of paragraphs corresponds to an aspect of the personal life;

generate the set of NL queries based on an application of the stored second ML model on the generated set of paragraphs; and generate a subset of NL queries of the generated set of NL queries for the each paragraph of the generated set of paragraphs.

15. The electronic device, according to claim 14, wherein the circuitry is further configured to:

determine, based on at least one paragraph of the generated set of paragraphs, a semantic relationship between each pair of NL queries of the set of NL queries; and assign a weight to each NL query of the set of NL queries based on a level of difficulty associated with a corresponding NL query of the set of NL queries and the determined semantic relationship, wherein the query database includes the assigned weight and the determined semantic relationship for each NL query of the set of NL queries.

16. The electronic device, according to claim 15, wherein the circuitry is further configured to:

determine, based on the determined first weighted score that is below the threshold score, a requirement to extract a second NL query from the query database, wherein the set of NL queries includes the second NL query; and extract the second NL query from the query database based on the determined requirement.

17. The electronic device according to claim 16, wherein the circuitry is further configured to extract the second NL query further based on at least one of the received first user response or the determined semantic relationship between the rendered first NL query and the second NL query.

18. The electronic device according to claim 16, wherein the circuitry is further configured to:

control the user device to further render the extracted second NL query;

receive a second user response to the rendered second NL query from the user device;

determine, based on the application of the first ML model on the second user response, a second weighted score for the received second user response;

compute a sum of the determined first weighted score and the determined second weighted score; and authenticate the received request further based on the computed sum that is above the threshold score.

19. The electronic device according to claim 13, wherein the circuitry is further configured to issue an authentication token to the web client based on the authentication of the received request.

20. A non-transitory computer-readable medium having stored thereon, computer-executable instructions that, when executed by an electronic device, causes the electronic device to perform operations, the operations comprising:

receiving, via a web client on a user device, a request to access a user account associated with a web-based application;

extracting a first natural language (NL) query from a query database based on the received request, wherein the query database includes a set of NL queries that is based on information associated with a personal life of a user, and the set of NL queries includes the extracted first NL query;

controlling the user device associated with the user to render the extracted first NL query;

receiving a first user response to the rendered first NL query from the user device;

determining, based on an application of a first machine learning (ML) model on the received first user response, a first weighted score for the received first user response, wherein the determined first weighted score indicates:

a level of difficulty associated with the rendered first NL query; and an accuracy of the received first user response with respect to a NL response for the rendered first NL query, and the query database includes the NL response;

authenticating the received request based on the determined first weighted score that is above a threshold score.

* * * * *